US010121276B2

(12) United States Patent
Reshetov et al.

(10) Patent No.: US 10,121,276 B2
(45) Date of Patent: Nov. 6, 2018

(54) INFINITE RESOLUTION TEXTURES

(71) Applicant: NVIDIA Corporation, Santa Clara, CA (US)

(72) Inventors: Alexander V. Reshetov, San Jose, CA (US); David Patrick Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 120 days.

(21) Appl. No.: 15/367,086

(22) Filed: Dec. 1, 2016

(65) Prior Publication Data

US 2018/0158227 A1 Jun. 7, 2018

(51) Int. Cl.
*G06T 15/04* (2011.01)
*G06T 7/00* (2017.01)
*G06T 1/20* (2006.01)

(52) U.S. Cl.
CPC ............... *G06T 15/04* (2013.01); *G06T 1/20* (2013.01); *G06T 7/0085* (2013.01); *G06T 2207/10004* (2013.01)

(58) Field of Classification Search
None
See application file for complete search history.

(56) References Cited

U.S. PATENT DOCUMENTS

2014/0123147 A1* 5/2014 Pantaleoni ........ G06F 17/30985
718/102

OTHER PUBLICATIONS

Stefan Gustavson, "Beyond the pixel: towards infinite resolution textures", Linköping University, ITN (stegu@itn.liu.se) Internal report, Feb. 16, 2006, Link—http://staffwww.itn.liu.se/~stegu/GLSL-conics/GLSL-conics.pdf.*
Bah T., "Inkscape: Guide to a Vector Drawing Program," Second Edition, Prentice Hall Press, 2009, pp. 1-390.
Batra, V., "Accelerating vector graphics rendering using the graphics hardware pipeline," ACM Trans. Graph., vol. 34, No. 4, Article 146, Aug. 2015, pp. 146:1-146:15.
Canny, J., "A Computational Approach to Edge Detection," IEEE Transactions on Pattern Analysis and Machine Intellegence, Pami-8, No. 6, Nov. 1986, pp. 679-698.
Lian, J., "On a-ary Subdivision for Curve Design: I. 4-Point and 6-Point Interpolatory Schemes," Applications and Applied Mathematics (AAM): An International Journal, vol. 3, Issue 1, Jun. 2008, pp. 18-29.

(Continued)

*Primary Examiner* — Nurun N Flora
(74) *Attorney, Agent, or Firm* — Zilka-Kotab, P.C.

(57) ABSTRACT

A method, computer readable medium, and system are disclosed for generating and utilizing infinite resolution texture acceleration data structures. The method for generating an infinite resolution texture acceleration data structure includes the steps of receiving an image; generating an infinite resolution texture acceleration data structure associated with the image that includes a texture map, a curve index map, and a curve data map; and storing the infinite resolution texture acceleration data structure in a memory. The texture map is a two-dimensional array of texels, each texel encoding a color value based on the image. The curve data map encodes parameters for at least one curve segment associated with the image. The curve index map associates each texel in the texture map with zero or more curve segments corresponding with the texel.

16 Claims, 15 Drawing Sheets

(56) References Cited

OTHER PUBLICATIONS

Dong et al., "Sparse Representation based Image Interpolation with Nonlocal Autoregressive Modeling," 2013, pp. 1-30.
Floater, M. S., "Rational Cubic Implicitization," in Mathematical Methods in CAGD III, 1995, pp. 1-9.
Ganacim F. et al., "Massively-parallel vector graphics," ACM Trans. Graph. , vol. 33, No. 6, 2014, pp. 1-14.
Jeon et al., "Single image super-resolution based on subpixel shifting model," Optik, vol. 126, 2015, pp. 4954-4959.
Jähne, B. et al., "Principles of Filter Design," Handbook of Computer Vision and Applications, Signal Processing and Pattern recognition, vol. 2, 1999, pp. 125-151.
Koschan et al., "Detection and Classification of Edges in Color Images," Signal Processing Magazine, Special Issue on Color Image Processing, vol. 22, No. 1, 2005, pp. 64-73.
Kilgard, M. J. et al., "GPU-accelerated Path Rendering," ACM Trans. Graph., vol. 31, No. 6, Nov. 2012, pp. 1-10.
Kniss et al., "IStar—A Raster Representation for Scalable image and Volume Data," IEEE Transactions on Visualization and Computer Graphics, vol. 13, No. 6, Nov./Dec. 2007, pp. 1424-1431.
Kopf, J. et al., "Depixelizing pixel art," ACM Trans. Graph., vol. 30, No. 4, Jul. 2011, pp. 1-8.
Loop, C. et al., "Resolution Independent Curve Rendering Using Programmable Graphics Hardware," 2005, pp. 1-10.
Maini, R. et al., "Study and Comparison of Various Image Edge Detection Techniques," International Journal of Image Processing, vol. 3, No. 1, Feb. 2009, pp. 1-11.
Mittal, A. et al., "Detection of Edges in Color Images: A Review and Evaluative Comparison of State-of-the-Art Techniques," Autonomous and Intelligent Systems (AIS), 2012, pp. 250-259.
Nehab, D. et al., "Random-Access Rendering of General Vector Graphics," ACM Trans. Graph., vol. 27, No. 5, Dec. 2008, pp. 135:1-135:10.
Nehab, D. et al., "A Fresh Look at Generalized Sampling," Foundations and Trends in Computer Graphics and Vision, vol. 8, No. 1, 2012, pp. 1-84.
Orzan, A. et al., "Diffusion Curves: A Vector Representation for Smooth-Shaded Images," ACM Trans. Graph., vol. 27, No. 3, 2008, pp. 1-8.
Phong, B. T., "Illumination for Computer Generated Pictures," Communications of the ACM, vol. 18, No. 6, Jun. 1975, pp. 311-317.
Papari, G. et al., "Edge and line oriented contour detection: State of the art," Image Vision Computing, vol. 29, 2011, pp. 79-103.
Qin, Z. et al., "Precise Vector Textures for Real-Time 3D Rendering," Symposium on Interactive 3D Graphics and Games, 2008, pp. 199-206.
Ray, N. et al., "Vector Texture Maps on the GPU," 2005, pp. 1-6.
Reshetov, A., "Reducing Aliasing Artifacts Through Resampling," Fourth ACM SIGGRAPH/Eurographics Conf. on High-Performance Graphics, 2012, pp. 77-86.
Shrivakshan et al., "A Comparison of various Edge Detection Techniques used in Image Processing," IJCSI International Journal of Computer Science Issues, vol. 9, Issue 5, No. 1, Sep. 2012, pp. 269-276.
Sen et al., "Shadow Silhouette Maps," ACM SIGGRAPH 2003 Papers, 2003, pp. 521-526.
Sen, P., "Silhouette Maps for Improved Texture Magnification," in Proc. of the ACM SIGGRAPH/Eurographics Conf. on Graphics Hardware, 2004, pp. 1-10.
Shapley et al., "Edge Detectors in Human Vision," The Journal of Physiology, vol. 229, 1973, pp. 165-183.
Song et al., "Vector Regression Functions for Texture Compression," ACM Transaction on Graphics. vol. 35, No. 1, 2015, pp. 1-10.
Sun et al., "Diffusion Curve Textures for Resolution Independent Texture Mapping," ACM Trans. Graph., vol. 31, No. 4, Jul. 2012, 74:1-74:9.
Tumblin et al., "Bixels: Picture Samples with Sharp Embedded Boundaries," Eurographics Symposium on Rendering, 2004, pp. 1-10.
Tarini et al., "Pinchmaps: textures with customizable discontinuities," Comput. Graph. Forum, vol. 24, No. 3, 2005, pp. 557-568.
"Techpowerup: GPU-Z Video card GPU Information Utility," Nov. 13, 2016, pp. 1-5, retrieved from https://web.archive.org/web/20161113112433/https://www.techpowerup.com/gpuz/.
Williams, L., "Pyramidal Parametrics," SIGGRAPH Comput. Graph, vol. 17, No. 3, Jul. 1983, pp. 1-11.
Ahn Y., KI. et al., "Approximation of circular arcs and offset curves by Bézier curves of high degree," Journal of Computational and Applied Mathematics, vol. 167, 2004, pp. 405-416.

* cited by examiner

US 10,121,276 B2

INFINITE RESOLUTION TEXTURES

FIELD OF THE INVENTION

The present invention relates to graphics processing, and more particularly to a technique for sampling texture maps.

BACKGROUND

Graphics applications, such as computer games, combine 3D geometric data with 2D texture data to generate images. However, conventional texture mapping may cause artifacts in the image under certain conditions. For example, sampling a texture map at a particular resolution may break down under scaling. Texture maps are registered to the underlying 3D geometry using texture coordinates. While the 3D geometry can be sampled at any scale, the texture map is registered to the geometry at a particular scale (or scales in the case of mip-mapped textures). Sampling these texture maps at resolutions much different than the provided scales may cause artifacts when the size of a texel varies greatly compared to the size of a pixel.

However, the use of texture maps was not always the way computer images were generated. Some of the earliest rendering techniques were vector-based rather than raster-based. In other words, images were rendered based on parameterized line segments and curves that could be easily rendered at any scale. Vector graphics continue to be used today in areas where quality approximation is not acceptable, such as in illustration and computer-aided design. Vector graphic formats, such as PostScript or SVG, can be conceptualized as programs that describe the process for rendering an image composed of potentially overlapping geometric primitives. For this reason, computing a color at a particular pixel may necessitate executing the whole "program" and can be inefficient in the context of graphics applications like computer games where only a portion of an image may need to be rendered and samples are irregularly distributed. Furthermore, vector graphics formats tend to be sequential in nature, which hinders any hardware optimization that can be implemented to make them more efficient. Thus, there is a need for addressing these issues and/or other issues associated with the prior art.

SUMMARY

A method, computer readable medium, and system are disclosed for generating and utilizing infinite resolution texture acceleration data structures. The method for generating an infinite resolution texture acceleration data structure includes the steps of receiving an image; generating an infinite resolution texture acceleration data structure associated with the image that includes a texture map, a curve index map, and a curve data map; and storing the infinite resolution texture acceleration data structure in a memory. The texture map is a two-dimensional array of texels, each texel encoding a color value based on the image. The curve data map encodes parameters for at least one curve segment associated with the image. The curve index map associates each texel in the texture map with zero or more curve segments corresponding with the texel.

DETAILED DESCRIPTION

Figure 1:
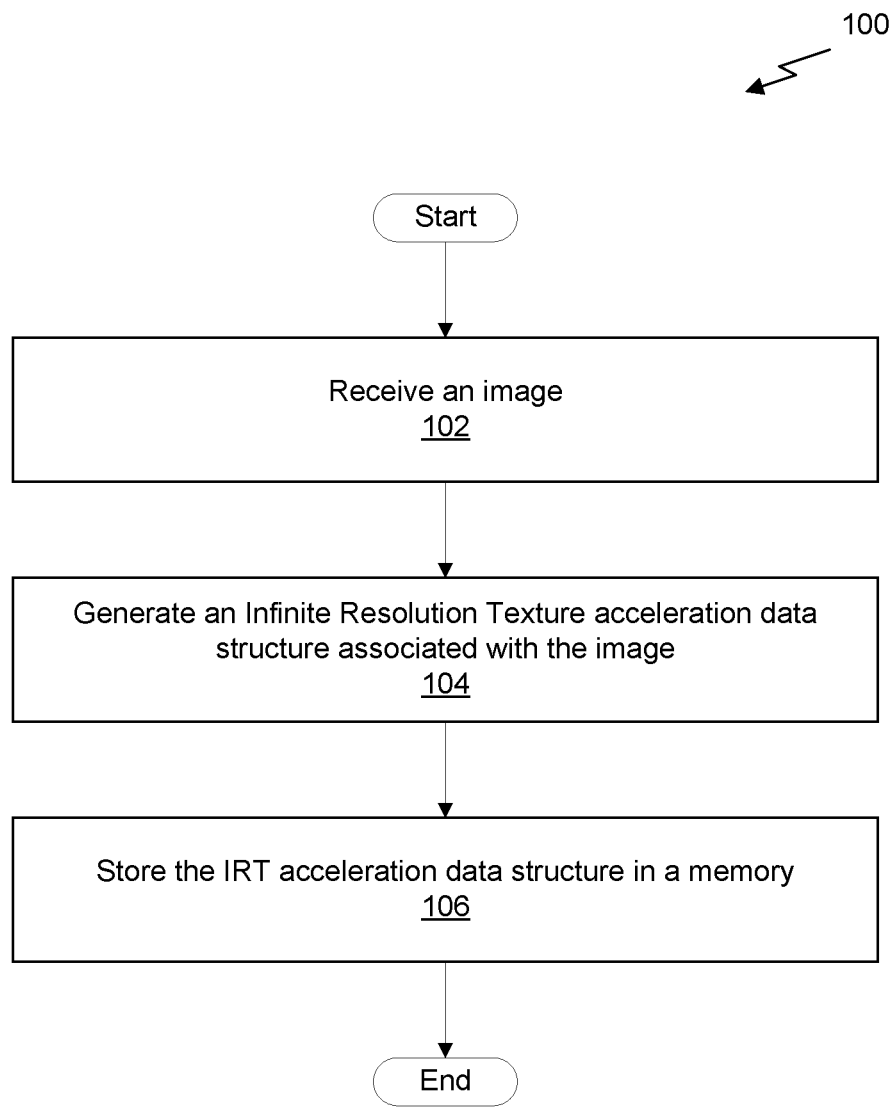
FIG. 1 illustrates a flowchart of a method generating an infinite resolution texture acceleration data structure, in accordance with one embodiment.

FIG. 1 illustrates a flowchart of a method 100 for generating an infinite resolution texture acceleration data structure, in accordance with one embodiment. It will be appreciated that the method 100 is described within the scope of software executed by a processor; however, in some embodiments, the method 100 may be implemented in hardware or some combination of hardware and software. The method 100 begins at step 102, where a processor receives an image. The image may be either a raster image or a vector image in one of a variety of image file formats. If the image is a vector image, the vector image may be rendered at a fine resolution to generate a corresponding raster image that will be used as a texture map.

At step 104, the processor generates an infinite resolution texture (IRT) acceleration data structure. The IRT acceleration data structure includes a texture map, a curve index map, and a curve data map. The texture map is a two-dimensional (2D) array of color values sampled from the image at an appropriate resolution. In one embodiment, the texture map may be identical to a raster image, or resampled at a different resolution. In another embodiment, the texture map may be produced by rendering a vector image to generate a raster image at the appropriate resolution. In one embodiment, the texture map may be a MIP map that includes a plurality of down-sampled versions of the image, each down-sampled version of the image associated with a different level of detail (LOD). The curve data map encodes parameters for at least one curve segment associated with the image. The image may be analyzed using an edge detection algorithm to identify the curve segments associated with the image. The curve index map associates each texel in the texture map with zero or more curve segments corresponding with the texel. The IRT acceleration data structure may be utilized to adjust texture coordinates of sample locations in areas close to one of the curve segments in the image.

At step 106, the processor stores the IRT acceleration data structure in a memory. The memory may be accessible by a parallel processing unit and, more specifically, by a texture unit associated with the parallel processing unit. A pixel shader or fragment shader (i.e., a program executed for each pixel/fragment in an image being rendered) may be configured to access the curve index map using texture coordinates for a sample location in order to determine if any curve segments influence the sample location. If there is at least one curve segment that influences the sample location, then a new sample location may be determined based on an adjustment vector calculated utilizing parameters for one or more curve segments stored in the curve data map. The new sample location may then be used to sample the texture map to calculate a color for the sample.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
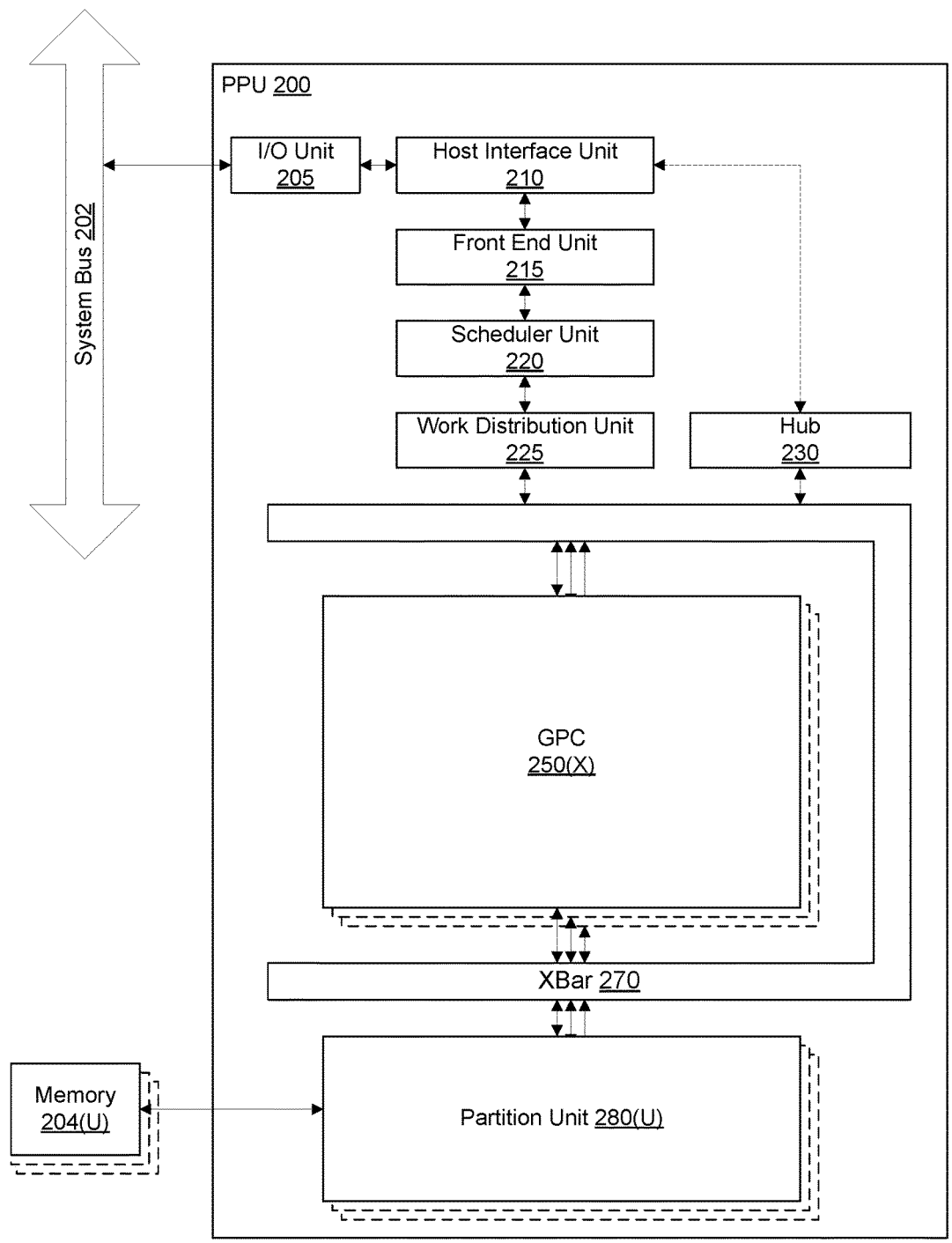
FIG. 2 illustrates a parallel processing unit (PPU), in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
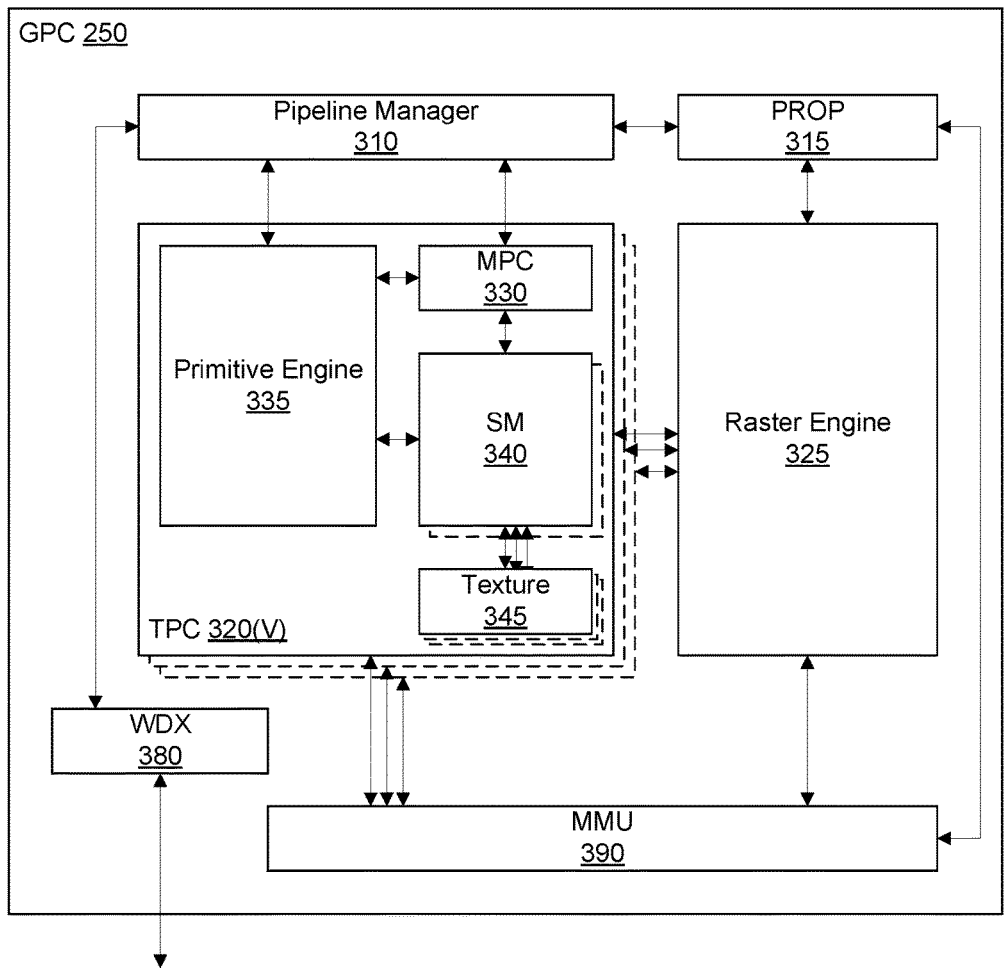
FIG. 3A illustrates a general processing cluster of the PPU of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
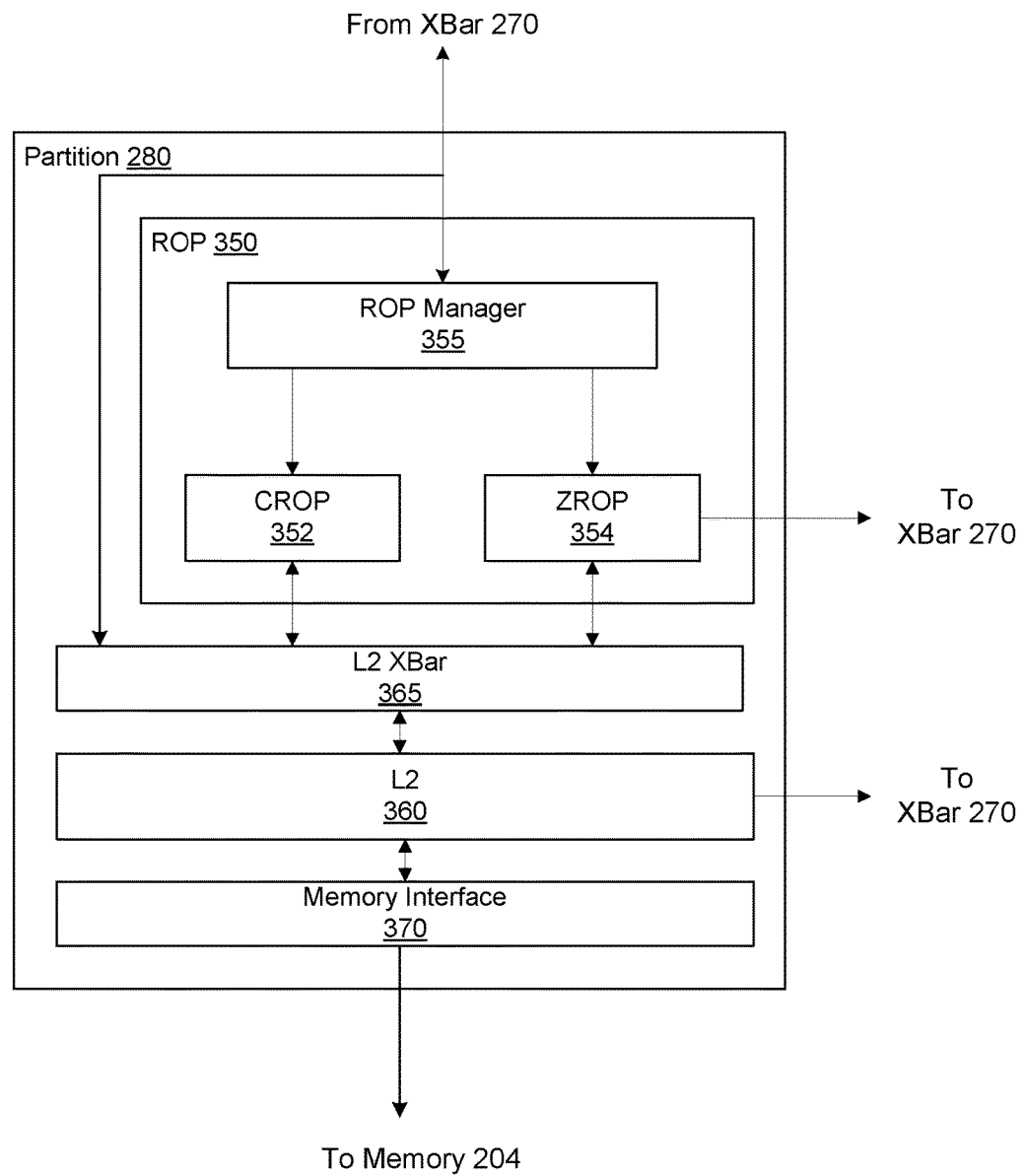
FIG. 3B illustrates a partition unit of the PPU of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
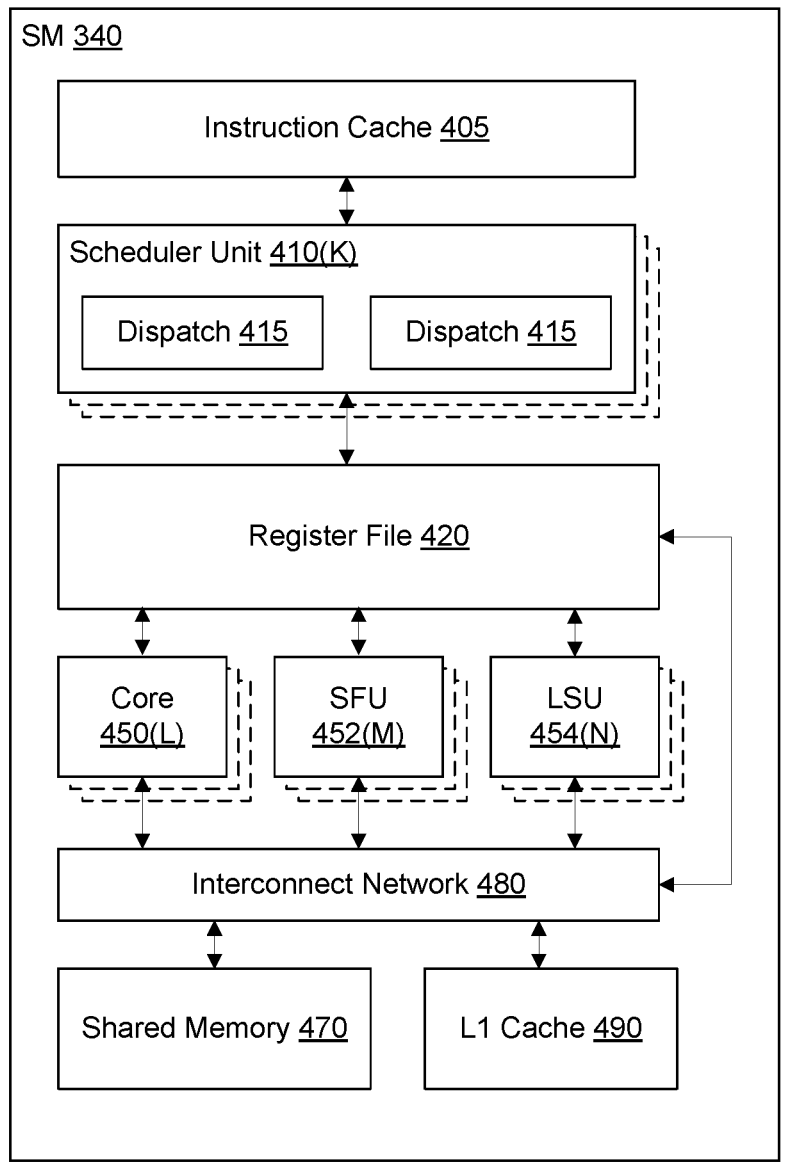
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
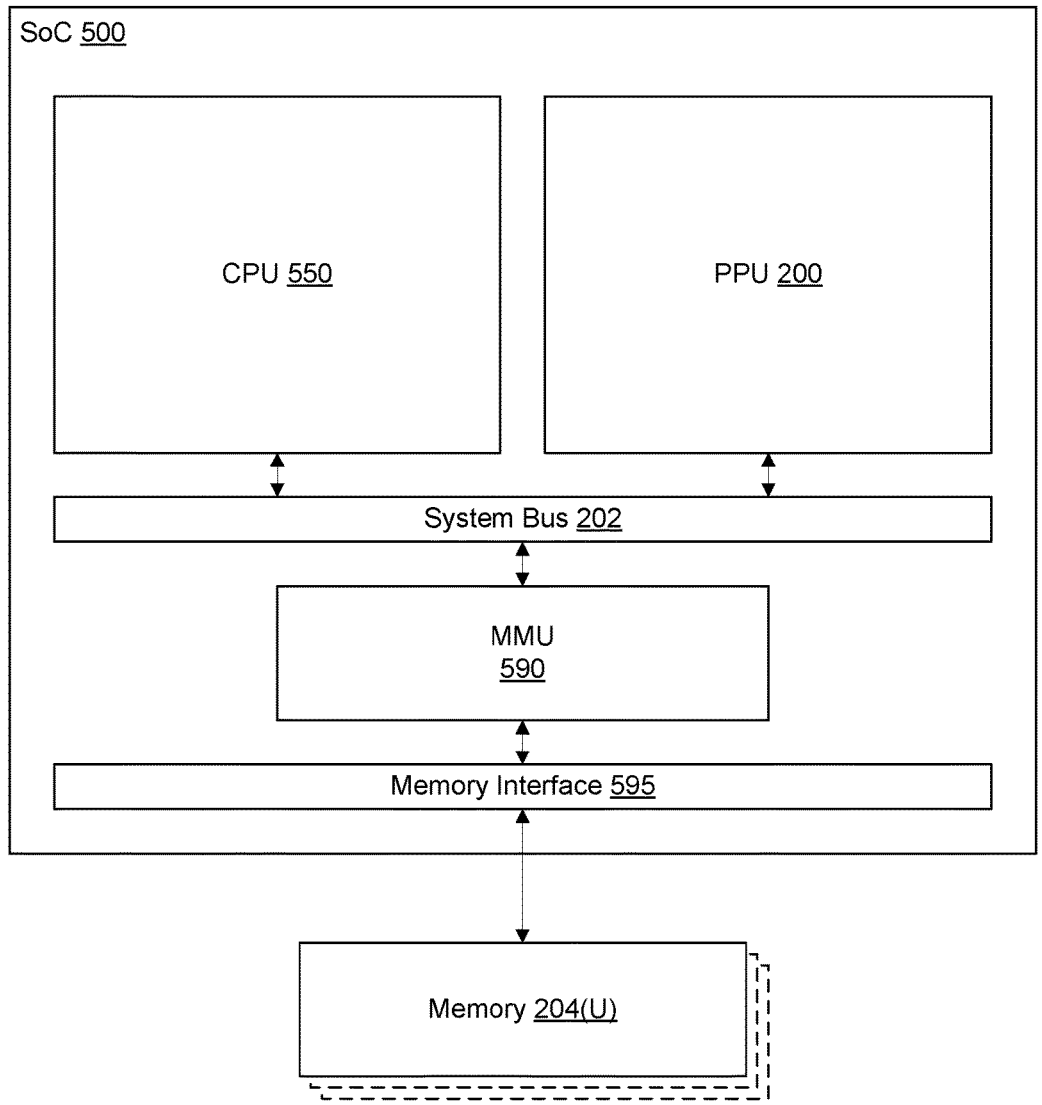
FIG. 5 illustrates a system-on-chip including the PPU of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
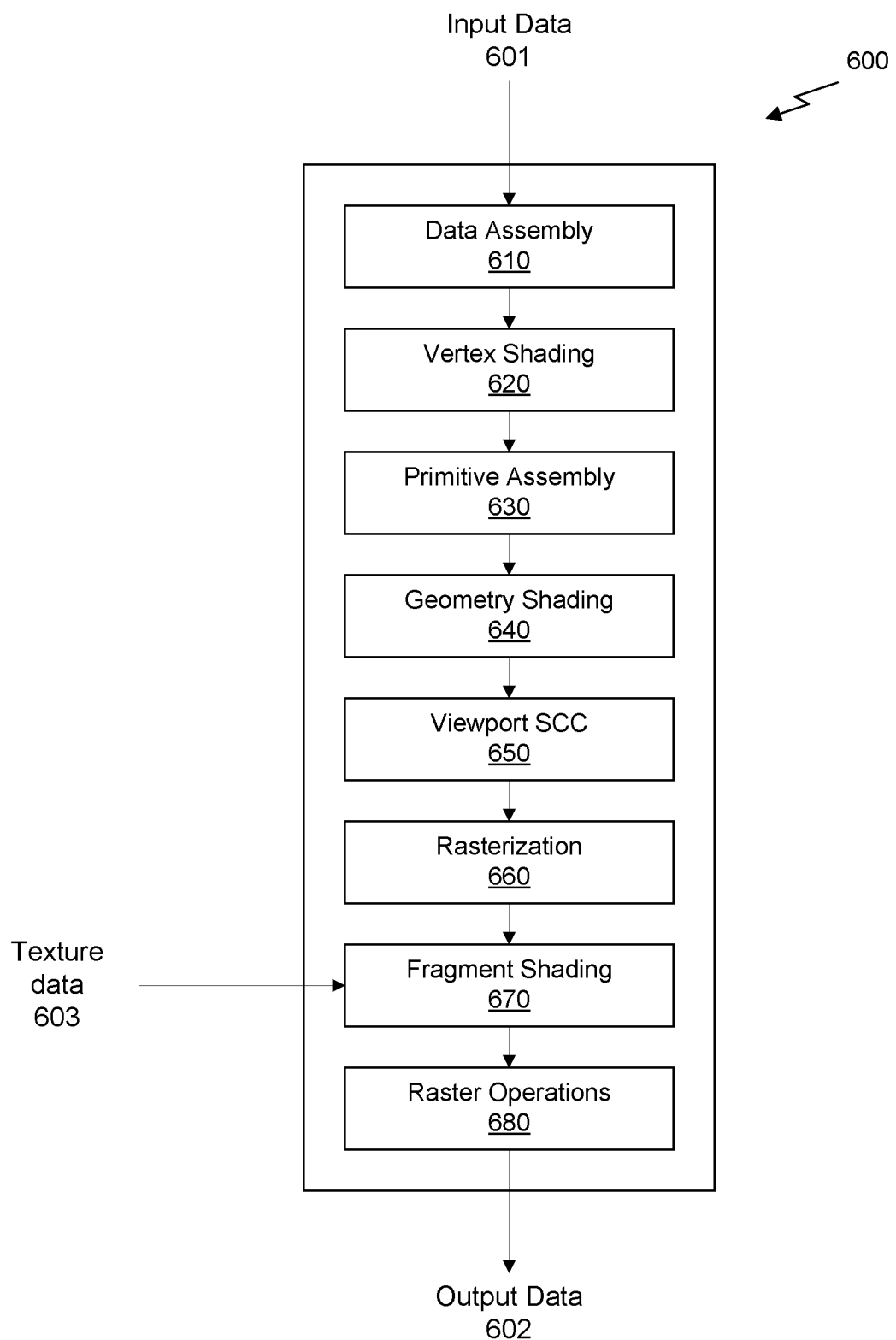
FIG. 6 is a conceptual diagram of a graphics processing pipeline implemented by the PPU of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

In one embodiment, the fragment shading stage 670 may sample a texture map using the texture unit(s) 345 of PPU 200. Texture data 603 may be read from the memory 204 and sampled using the texture unit 345 hardware. The texture unit 345 may return a sampled value to the fragment shading stage 670 to be processed by the fragment shader.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Infinite Resolution Textures

Figure 7:
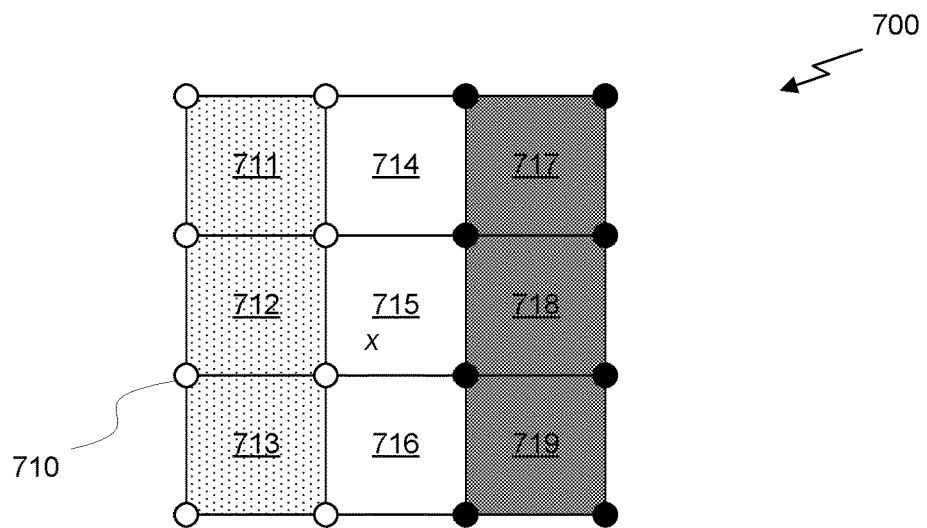
FIG. 7 is a conceptual illustration of a pinching operation associated with a pinchmap, in accordance with the prior art.
Figure 7:
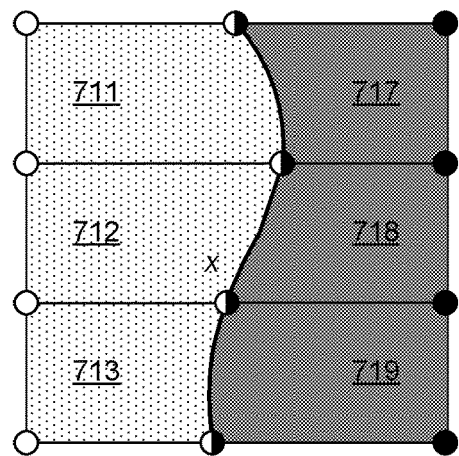

FIG. 7 is a conceptual illustration of a pinching operation associated with a pinchmap, in accordance with the prior art. Pinchmaps were proposed as a technique to improve the results of bilinear interpolation of texel values around discontinuities (i.e., edges) in the texture data. Pinchmaps are disclosed in detail by Tarini et al., "Pinchmaps: textures with customizable discontinuities", Comput. Graph. Forum 24, 3 (2005), which is incorporated by reference herein in its entirety. A pinchmap is essentially a pair of textures. A first texture stores texels (i.e., sample color values of a raster image) at particular sample locations defined in a texture coordinate space (i.e., uv space). An auxiliary texture stores parameters corresponding to each texel that define a pinching operation in the texture coordinate space.

As shown in FIG. 7, a texture map 700 includes a number of texels 710 defined at different u,v coordinates, usually specified in a 2D grid. Taking a sample value at a particular sample location x is typically performed by fetching the texel values at the four corners of the region (i.e., all points between a set of four corresponding texels) that includes sample location x and performing a bilinear interpolation of the four texel values. However, when sample location x is located proximate to discontinuities (i.e., edges or silhouettes) in the raster image, the results of this interpolation can produce inaccurate values.

The texture coordinate space can be segmented into regions between each of the texels, each region having a texel located at the four corners of the region. Some regions, such as regions 711, 712, and 713, may include texels having texel values approximately similar to a first color, and other regions, such as regions 717, 718, and 719 may include texels having texel values approximately similar to a second color. However, some regions may include texels associated with two or more objects of different colors, such as regions 714, 715, and 716. Regions 714, 715, and 716 have two texels associated with the color of a first object and two texels associated with the color of a second object. For such texels, bilinear interpolation can produce artifacts.

Pinchmaps provide a solution by mapping a sample location proximate such discontinuities to a new sample location using the parameters in the auxiliary texture map to avoid these inaccurate interpolation results. The parameters determine a mapping that shifts the sample location x to a different region away from the discontinuity. For example, the sample location x, which would normally fall in region 715 of the texture map 700 is mapped to a location in region 712, effectively eliminating regions 714, 715, and 716 from being sampled.

Pinchmaps effectively change how a texture map is sampled near edges in the texture map. However, the solution provided by the pinchmap is limited in effectiveness because each region can only encode a single quadratic curve within a region between four pinchmap texels and the magnitude of the texture coordinate adjustment is restricted by a pinchmap texel size. Sample locations on one side of the curve are shifted in one direction and sample locations on the other side of the curve are shifted in another direction. This is a problem when the discontinuities within a region cannot be defined by a single curve. For example, a region may overlap edges corresponding with the intersection of two or more objects within an image. In the worst case example, a first texel associated with a region may correspond to a first color of a first object, a second texel associated with the region may correspond to a second color of a second object, a third texel associated with the region may correspond to a third color of a third object, and a fourth texel associated with the region may correspond to a fourth color of a fourth object.

Infinite resolution textures expand on pinchmaps by encoding curve segments identified in a raster image and per pixel indices into the list of curve segments that map texture coordinates to a list of curves that influence samples within a region. Each curve segment is associated with a truncated Voronoi cell that refers to a region of all u,v coordinates closer to the curve segment than any other curve segment. Such cells are not restricted in size, a priori, providing a greater flexibility and more accurate results when compared to pinchmaps.

Figure 8:
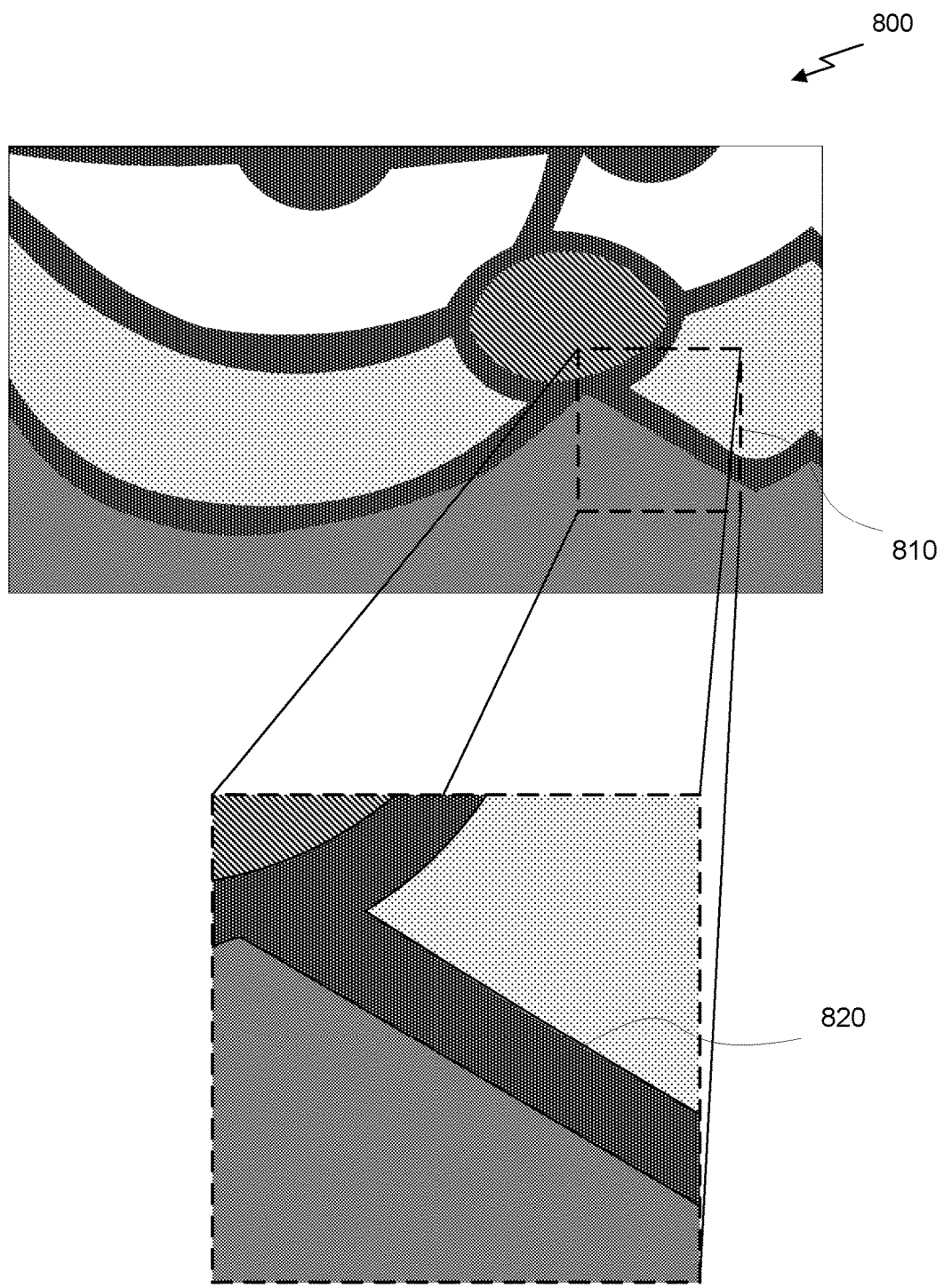
FIG. 8 illustrates a raster image, in accordance with one embodiment.

FIG. 8 illustrates a raster image 800, in accordance with one embodiment. The raster image 800 comprises a two-dimensional array of pixels, each pixel assigned a color value in a color space, such as the RGB color space. The image 800 can be analyzed by an edge detection algorithm to generate a list of curves or curve segments that define edges, silhouettes, or discontinuities within the raster image 800. Looking closely at a blown-up view of region 810, the pixels in this region include four different colors and five curve segments 820 that separate these colors.

An infinite resolution texture acceleration data structure may be generated based on either a raster image or a vector image. When the infinite resolution texture is based on a raster image, such as image 800, an edge detection algorithm is utilized to generate the list of curve segments associated with the raster image. In one embodiment, the edge detection algorithm is implemented as a modified version of the Canny edge detector, developed by John Canny in 1986. First, gradients for each pixel are calculated by computing the 3×2 Jacobian J of the partial derivatives along the x and y directions for each RGB component of the raster image and then finding the largest eigenvalue of 2×2 matrix $J^T J$. The square root of the eigenvalue gives the edge strength and the corresponding eigenvector is the gradient normal. Computing the partial derivatives for each pixel of the raster image may be performed using the Scharr operator due to its improved rotational symmetry. An edge thinning step (i.e., non-maximum suppression step) is implemented by invalidating all pixels for which the edge strength (defined as the square root of the eigenvalue) is less than either of the two edge strength values for pixels sampled in the positive or negative gradient direction. Once the non-maximum suppression step has been completed, a set of edge pixels in the raster image has been identified.

Each edge pixel may define a point on a corresponding curve segment. In one embodiment, the center of the edge pixel is used as a point on the curve segment. In another embodiment, the point on the curve segment defined for an edge pixel can be tuned by fitting a parabola to the three edge strength values that were used for the non-maximum suppression step. A sub-pixel position can be calculated for each edge pixel having an edge strength that is a local maximum. In other words, even if a pixel is associated with an edge strength that is a local maximum among the three pixels along the gradient direction, the actual position of the point on the curve segment may be offset from the center of the pixel, and the position of the edge can be more accurately estimated by fitting the three strength values to a parabolic curve and finding the point along the gradient direction between pixels that corresponds with a maximum of the parabolic curve. This location will be offset from the center of the pixel along the gradient direction by less than the distance between the sampled pixels.

Once all of the pixels having an edge strength that is a local maximum have been identified, the next step in the edge detection algorithm is identifying which pixels are connected along a particular edge. An image can have many edges included in the image, so the algorithm must group the pixels for each edge together into subgroups associated with each edge. In one embodiment, a parallel algorithm is utilized to facilitate the grouping of edge pixels. For each edge pixel, a tangent vector of the edge is defined as an orthogonal vector to the gradient direction. A goal of the algorithm for connecting edge pixels is to determine two neighbors for each edge pixel in such a way that a vector from the edge pixel to the neighboring pixel does not vary too wildly from the tangent vector.

Figure 9A:
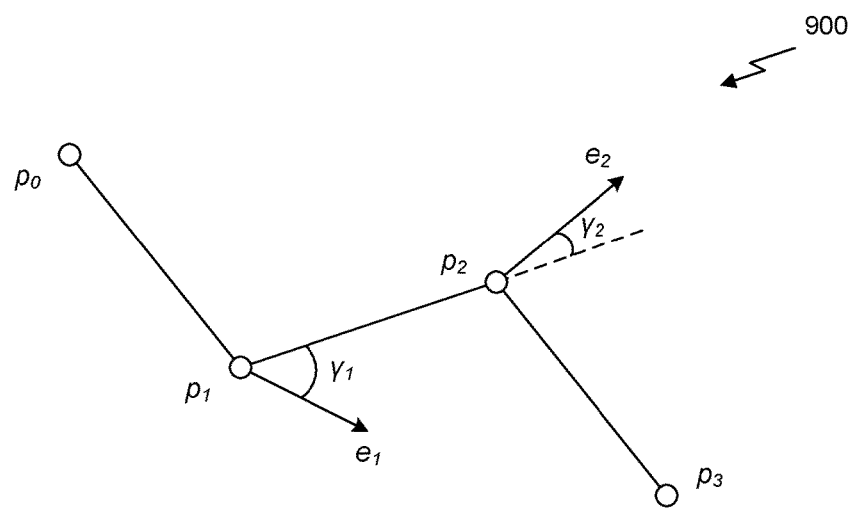
FIG. 9A illustrates a connection step in an edge detection algorithm, in accordance with one embodiment.

FIG. 9A illustrates a connection step in an edge detection algorithm, in accordance with one embodiment. As shown in FIG. 9A, four edge pixels, $p_0$, $p_1$, $p_2$, and $p_3$, have been identified by computing the gradients for each pixel and invalidating all pixels that are not associated with a local-maximum edge strength, as discussed above. Once the set of edge pixels is identified, these pixels need to be connected in some manner to define one or more edges in the raster image. For each edge pixel identified in the raster image, a set of neighboring pixels may be identified and a metric value m is calculated for each neighboring pixel in the set of neighboring pixels. The neighboring pixel associated with the maximum value of m is identified as a potential candidate pixel. The metric m may be calculated as follows:

$$m = \frac{(\cos\gamma_1 + |\cos\gamma_2|)}{\|p_2 - p_1\|} \sqrt{s_2} \qquad (\text{Eq. 1})$$

where $\gamma_1$ and $\gamma_2$ are angles between the vector connecting the edge pixel, $p_1$, and a neighboring pixel, $p_2$, and the expected tangent vector at the edge pixel, $e_1$, and expected tangent vector at the neighboring pixel, $e_2$, respectively; and $s_2$ is the edge strength of the neighboring pixel, $p_2$. The best candidate is the neighboring pixel which is closest to the edge pixel in a direction along the expected tangent of the edge pixel that also has the largest edge strength. Applying Equation 1 to each of a subset of neighboring pixels will yield a candidate pixel associated with a positive tangent vector $e_1$ of the edge pixel. The same process can be repeated to yield a second candidate pixel associated with a negative tangent vector (i.e., $-e_1$) of the edge pixel.

As shown in FIG. 9A, a set of four edge pixels 900 are identified by analyzing the gradients within the raster image. Each of the four edge pixels 900 may then be processed to identify two candidate pixels within a local neighborhood that would be the best candidates to be included in a set of points of a particular edge in the image. For a given edge pixel, such as edge pixel $p_1$, a metric value m is calculated for each of the neighboring pixels to edge pixel $p_1$. In other words, a metric value $m_0$ is calculated for neighboring pixel $p_0$, a metric value $m_2$ is calculated for neighboring pixel $p_2$, and a metric value $m_3$ is calculated for neighboring pixel $p_3$. It may be determined that metric value $m_2$ is a maximum metric value for all the neighboring pixels, making pixel $p_2$ a candidate pixel to include within an edge defined by pixels $p_1$ and $p_2$. It may also be determined that metric value $m_0$ is a maximum metric value for all the neighboring pixels when using the negative tangent vector $-e_1$. Thus, two candidate pixels may be identified using both the tangent vector and negative tangent vector to calculate metric values for each neighboring pixel.

In parallel, the same procedure can be performed for each of the other edge pixels $p_0$, $p_2$, and $p_3$. The candidate pixels are then compared to determine if any two edge pixels should be connected. If pixel $p_2$ is a candidate pixel for pixel $p_1$ and pixel $p_1$ is a candidate pixel for pixel $p_2$, then the two edge pixels are connected. The edge sequences of candidate pixels may be identified by connecting chains of candidate pixels. For example, pixel $p_0$ may be connected to pixel $p_1$, and pixel $p_1$ may be connected to pixel $p_2$ to form a chain of three pixels that define an edge sequence. Pixel $p_3$ may not be included in the chain if pixel $p_2$ was not identified as a candidate pixel for pixel $p_3$, in which case pixel $p_3$ may be included in a different edge sequence with zero or more other edge pixels. In one embodiment, edge sequences are required to have at least two edge pixels included in the sequence. If any edge pixels are not connected to any other edge pixels, then those edge pixels may be discarded.

In one embodiment, once the edge pixels have been connected to identify a number of edge sequences, edge sequences having a mean edge strength below a threshold value, σ, can be eliminated. In other words, for each edge sequence, a mean edge strength of all of the edge pixels included in the edge sequence is calculated and compared against the threshold value. All edge sequences having a mean edge strength below the threshold value are discarded. The threshold value may be adjusted to discard weak edges. Adjustments may be made manually to achieve a desired result in image quality, or automatically to attempt to identify a particular threshold number of edges in an image. In one embodiment, the threshold value can be adjusted automatically between a minimum value and maximum value until the number of edge pixels included in acceptable edge sequences is proximate to a target percentage of the total number of pixels in the raster image.

Figure 9B:
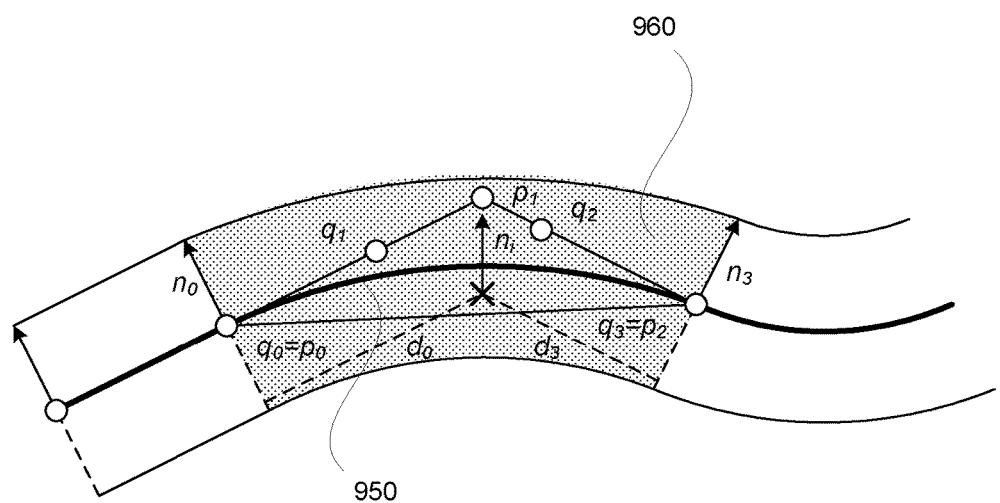
FIG. 9B illustrates a continuous curve fit to a sequence of edge pixels, in accordance with one embodiment.

FIG. 9B illustrates a continuous curve 950 fit to a sequence of edge pixels, in accordance with one embodiment. The goal of identifying edges in the raster image is to adjust sampling coordinates in areas proximate to the edges thereby avoiding interpolation of samples on both sides of the edge. Similar to pinchmaps, one technique for avoiding sampling the raster image in areas proximate to the edge is to adjust the sample location and move the sample location away from the edge, as will be discussed in more detail below. In order to determine an adjustment to the sample location, a direction and magnitude of an adjustment vector needs to be calculated, where the adjustment vector is based on a distance of the sample location to the curve. Thus, continuous curves that pass through the edge pixels in the sequences of edge pixels must be defined and stored along with the raster image. The manner in which curves are encoded may be selected in order to simplify calculations for determining the adjustment vector during texture operations using the infinite resolution texture. In one embodiment, each curve segment is represented as a cubic Bezier curve.

As shown in FIG. 9B, a cubic Bezier curve passing through two points, such as two adjacent edge pixels in an edge sequence, may be defined by a set of four control points: $q_0$, $q_1$, $q_2$, and $q_3$. A first control point $q_0$ indicates a start of the curve segment at edge pixel $p_0$, and a fourth control point $q_3$ indicates an end of the curve segment at edge pixel $p_2$. A second control point $q_1$ is located along a tangent vector to the curve segment that passes through the first control point $q_0$, and a third control point $q_2$ is located along a tangent vector to the curve segment that passes through the fourth control point $q_3$. A point $p_1$ is located at the intersection of the two tangent vectors. The location of control points $q_1$ and $q_2$ may be selected by choosing locations on the tangent vectors that, when projected on the vector from $p_0$ to $p_2$, uniformly trisect the vector from $p_0$ to $p_2$.

Based on a technique described in Floater, "Rational cubic implicitization," Mathematical Methods for Curves and Surfaces, pp. 151-159 (1995), which is hereby incorporated by reference herein in its entirety, a distance of a sample location x to the Bezier curve defined by the four control points can be approximated by solving the following equations that define an implicit representation of the curve by six coefficients and a formula for approximating a distance of any point to the curve within the triangle $p_0p_1p_2$:

$$q_1 = (1-\lambda_1)p_0 + \lambda_1 p_1 \quad \text{(Eq. 2)}$$

$$q_2 = (1-\lambda_2)p_2 + \lambda_2 p_1 \quad \text{(Eq. 3)}$$

$$\alpha_i = 3(1-\lambda_i): i=1,2 \quad \text{(Eq. 4)}$$

$$\beta_i = 3\lambda_i: i=\{1,2\} \quad \text{(Eq. 5)}$$

$$\Phi_i = \beta_i - \alpha_k \lambda_k: i=\{1,2\}; k=\{1,2\} \quad \text{(Eq. 6)}$$

$$A = -\beta_1^2 \Phi_1 \quad \text{(Eq. 7)}$$

$$B = -\beta_1^2 \Phi_2 \quad \text{(Eq. 8)}$$

$$C = -3\beta_1\beta_2 + 2\beta_1^2\alpha_1 + 2\beta_2^2\alpha_2 - \beta_1\beta_2\alpha_1\alpha_2 \quad \text{(Eq. 9)}$$

$$D = \alpha_2 \Phi_1 \quad \text{(Eq. 10)}$$

$$E = \alpha_1 \Phi_2 \quad \text{(Eq. 11)}$$

$$F = 1 - \alpha_1\alpha_2 \quad \text{(Eq. 12)}$$

$$f(x,y) = A\tau_0^2\tau_2 + B\tau_0\tau_2^2 + C\tau_0\tau_1\tau_2 + D\tau_0\tau_1^2 + E\tau_1^2\tau_2 + F\tau_1^3 \quad \text{(Eq. 13)}$$

It will be appreciated that $\lambda_1$ and $\lambda_2$ are parameters that identify where between $p_0$ and $p_1$ and $p_2$ and $p_1$, respectively, the second and third control points lie. Furthermore, the terms $\tau_0$, $\tau_1$, and $\tau_2$ are the barycentric coordinates of point {x,y} in the triangle $p_0p_1p_2$ where $\tau_0+\tau_1+\tau_2=1$. The function $f$ in Equation 13 is an implicit representation of the Bezier curve because $f \equiv 0$ on the curve.

Floater proves that $f$ in Equation 13 is unique inside the Bezier triangle $p_0p_1p_2$ iff $\Phi_1\Phi_2 > 0$. However, in order to use $f$ for all texels within the greater Voronoi region 960 associated with the curve segment between $p_0$ and $p_2$, coefficients A-F can be scaled to approximate the distance to the curve for sample location x anywhere within the Voronoi region 960. Scaling the coefficients can be achieved by noticing that the implicit equation $f(x,y)=0$ remains correct if the function is multiplied by any non-zero value s. Accordingly, a constant scaling factor s is chosen such that $sf(x,y)$ yields the best approximation to the distances to the curve within the Voronoi region 960. Another possibility to approximate the distance to the curve is to use $f/|\nabla f|$ (i.e., use non-constant scaling factor $s=1/|\nabla f|$). This would result in a better approximation, but would be more expensive to compute.

It must be noted that this solution is only an approximation of a true distance to the curve, but analysis of the error of such approximation shows that the error is less than 10% everywhere in the Voronoi region as long as the acute angles $\angle p_1p_0p_2$ and $\angle p_1p_2p_0$ are smaller than 0.1 radians ($\approx 34°$) and the length of the edges (l=2h) of the Voronoi region 960 is less than $2\|q_0-q_3\|$. In order to avoid instances where the approximation error becomes too large, any curve segments where the acute angles $\angle p_1p_0p_2$ and $\angle p_1p_2p_0$ would be too large (i.e., ≥35) is approximated as a straight curve segment.

Each straight curve segment can be treated as a cubic Bezier curve with $q_1$ and $q_2$ lying on $[q_0, q_3]$, in order to minimize code divergence when calculating distance to the curve segments. This would result in infinite barycentric coordinates for a point {x,y} in the Voronoi region, and would result in a division by zero error when solving for the coefficients of function $f$. The error can be avoided by simply dropping the normalization requirement ($\tau_0+\tau_1+\tau_2=1$) and directly including the distance scaling into the six coefficients A-F to arrive at a very simple solution of computing the barycentric coordinates using two dot products with the edges of the Bezier triangle.

Again, a signed distance to the curve for any point {x,y} can be approximated by using a function $f$ in Equation 13, which yields a scalar value that is positive on one side of the curve segment and negative on the other side of the curve segment. In order to find an adjustment vector to move a sample location x, the scalar value of function $f$ in Equation 13 is multiplied by the normal vector, $n_i$, to the curve associated with the sample location x. The normal vector $n_i$ may be found by interpolating between the normal vectors at points $p_0$ and $p_2$. The interpolation may be performed by using the signed distances from point {x,y} to the edges of the curve's Voronoi region $d_0$ and $d_3$ to find the ratio of:

$$\rho_n = \frac{\|d_0\|}{\|d_0\| + \|d_3\|} \quad \text{(Eq. 14)}$$

which yields an interpolation parameter $\rho_n$ such that:

$$n_i = (1-\rho_n)n_0 + \rho_n n_3 \quad \text{(Eq. 15)}$$

A cubic polynomial curve is a bad choice for approximating a linear distance far off the curve. In another embodiment, a solution to determining a distance to a curve uses rational curves instead of cubic Bezier curves. Let a distance $d_n$ be a distance from the sample location x to the line from control point $q_0$ to control point $q_3$ along the interpolated normal $n_i$. The normal $n_i$ can be computed using weights $\tau_0$ and $\tau_3$:

$$t_0 = \frac{\|d_0\|}{\|d_0\| + \|d_3\|} \quad \text{(Eq. 16)}$$

$$t_3 = \frac{\|d_3\|}{\|d_0\| + \|d_3\|} \quad \text{(Eq. 17)}$$

Without loss of generality, the function $f$ that gives an approximation of distance to the curve can be represented as:

$$f(x,y) = d_n + g(d_0, d_n, d_3) t_0 t_3 \quad \text{(Eq. 18)}$$

In one embodiment, the function g that satisfies the boundary conditions is given by:

$$g(d_0, d_n, d_3) = a_3 d_0 + a_0 d_3 \quad \text{(Eq. 19)}$$

where $a_0 = \tan(\theta_0)$ and $a_3 = \tan(-\theta_3)$, and where $\theta_0 = \angle p_1 p_0 p_2$ and $\theta_3 = \angle p_1 p_2 p_0$. Furthermore, the approximation property of function $f$ can be improved by adding a quadratic term to function $f$ as such:

$$f(x,y) = d_n + (a_3 d_0 + a_0 d_3) t_0 t_3 + c(d_0+d_3)(t_0 t_3)^2 \quad \text{(Eq. 20)}$$

where c is a constant that can be used to fit the given points between $q_0$ and $q_3$. A solution for c can be found by performing a linear regression that minimizes curve deviation from a given set of points {$x_i$, $y_i$}.

No matter which function $f$ is utilized to encode an implicit representation of a curve segment, an acceleration structure for the infinite resolution texture is stored that includes a first data structure for encoding the color samples for each pixel of a raster image and a second data structure that associates each pixel of the raster image with one or more curve segments that influence the pixel. In one embodiment, the first data structure stores a number of color component values for each pixel of the raster image. The first data structure is a two-dimensional array of pixel values, each pixel values being one or more components. In one embodiment, the pixel values may be encoded as a single grayscale value. In other embodiments, the pixel values may be encoded as multiple color components; e.g., RGB, RGBA, YCrCb, CMYK, and so forth. The first data structure may be stored as a two-dimensional array, with each entry of the array storing multiple values corresponding to the multiple color components, or as a set of two-dimensional arrays, each array storing values for a particular color component.

The second data structure may also be a two-dimensional array, with each entry of the array corresponding to a pixel of the raster image that is used as the texture map 1002. The second data structure is populated with indices into a list of curve segments associated with the raster image. For each pixel in the raster image that is influenced by a curve segment, an index for a first entry in the list of curve segments is stored in the corresponding entry in the second data structure. The list of curve segments includes a number of entries, each entry corresponding to a pixel influenced by at least one curve segment. Each entry may encode the parameters for implicitly describing one or more curve segments that influence the corresponding pixel of the raster image.

For example, a first entry in the list may encode a single curve segment that influences a first pixel in the raster image. In one embodiment, the entry encodes the six coefficients, A-F, to the implicit representation of the curve segment. The entry may also encode control points and/or normal vectors associated with the curve segment, such as: control points $q_0$, $q_1$, $q_2$, and $q_3$; normal $n_1$, and $n_3$; or $p_0$, $p_1$, and $p_2$. From these parameters, a distance to the curve segment from any sample location x within the Voronoi region can be calculated based on Equation 13. In another embodiment, the entry encodes the constant c along with the control points and/or normal vectors associated with the rational curve segment defined in Equation 20. From these parameters, a distance to the curve segment from any sample location x within the Voronoi region can be calculated based on Equation 20.

A second entry in the list may encode a plurality of curve segments that influence a second pixel in the raster image. It will be appreciated that more than one curve segment may influence a particular pixel in the image because the area of influence is defined by the corresponding Voronoi region. This can also happen where edges intersect. The parameters for each curve segment are encoded sequentially in the entry of the list. Whether the entry includes one curve segment or a plurality of curve segments, the first parameter for the next curve segment in the entry may be set to a void value (e.g., binary 0xffff) to indicate that the entry contains no more curve segments associated with that pixel of the raster image. When reading the parameter of the next curve segment from the list, an algorithm can check for the void value to determine whether there is another valid curve segment encoded within the entry of the list. Again, the second data structure may comprise a 2D array that stores an index into the list for the start of each entry corresponding to the pixel associated with that index of the 2D array. Parameters for a particular curve segment may be stored in the list in multiple entries when those curve segments influence more than one pixel in the raster image. Even though it is not efficient to store the parameters for a single curve segment in multiple entries, such storage reduces a level of indirection when accessing the parameters by not having to access a different location that stores the parameters for a curve segment pointed to by multiple entries. In alternative embodiments, each entry in the list may merely include pointers to the locations of parameters for each curve segment influenced by the pixel. While this minimizes the storage required for parameters of edge segments, it adds an additional layer of indirection to read such parameters based on the sample location.

The above discussion has been applicable to a technique for preprocessing a raster image to generate an infinite resolution texture acceleration data structure based on a raster image. Alternatively, the infinite resolution texture acceleration data structure may be generated based on a vector-based image. In one embodiment, the infinite resolution texture acceleration data structure may be generated based on a vector image by rendering the vector image at a high resolution into a raster image, and then extracting curve segments from the rendered raster image as described above. In another embodiment, the curve segments associated with the raster image may be extracted directly from the vector image description. The vector image may be rendered to produce a corresponding raster image and then the curve segments may be registered to a coordinate space of the raster image. This may avoid the step of extracting edges from the raster image by using the explicit encoding of such edges within the vector image. In either case, the resulting infinite resolution texture acceleration data structure includes a first data structure storing a raster image at an appropriate resolution and a second data structure that maps each pixel of the raster image to a list of zero or more curve segments that influence that pixel.

In one embodiment, the infinite resolution texture may implement MIP mapping. MIP mapping is a technique for storing a hierarchy of down-sampled versions of the raster image corresponding to different levels of detail. The level of detail may be calculated based on the ratio of rendered pixel size to texel size (i.e., comparing the size of a pixel in the raster image to a size of the pixel in the image being rendered) during run time. Typically, each level of detail corresponds to a raster image at a resolution of ½ the level of detail below it (i.e., LOD 1 corresponds to half the resolution of LOD 0). The curve segment data only applies to the base raster image at the highest resolution (i.e., LOD 0). When a texture sample is taken at any other level of detail, then the sample location is not adjusted according to the curve segments that influence the corresponding texel.

Figure 10:
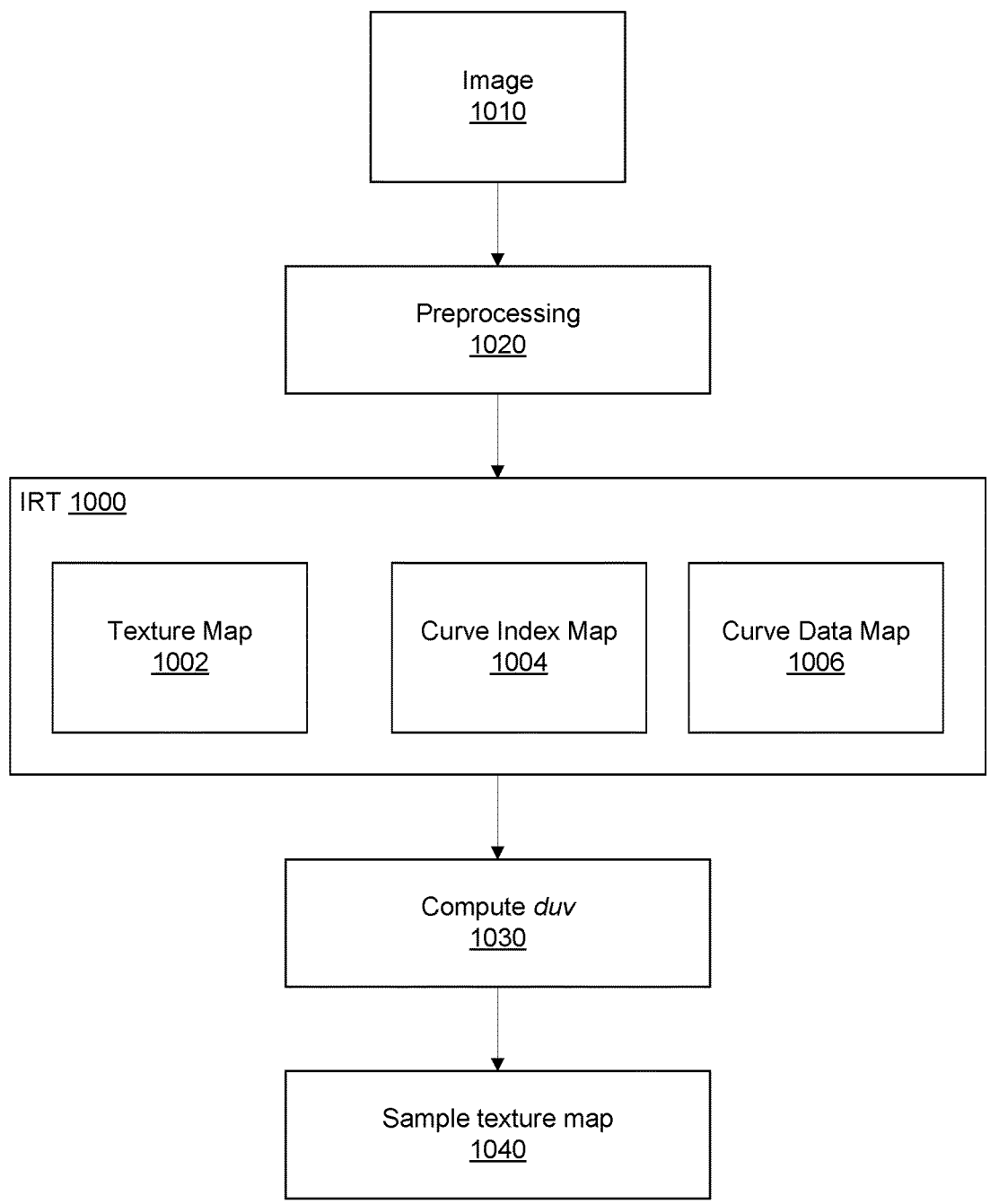
FIG. 10 illustrates the data flow to generate and utilize an infinite resolution texture acceleration data structure, in accordance with one embodiment.

FIG. 10 illustrates the data flow to generate and utilize an IRT acceleration data structure 1000, in accordance with one embodiment. As shown in FIG. 10, an image 1010 is received to generate the IRT acceleration data structure 1000. The image 1010 may be a raster image or a vector image in a variety of image file formats (e.g., JPEG, BMP, SVG, etc.). A preprocessing step 1020 is executed by a processor to generate the IRT 1000. The preprocessing step 1020 may implement the method 100. In one embodiment, the preprocessing step 1020 is a software program (i.e., series of instructions) executed by a CPU. If the image 1010 is a vector image, the preprocessing step 1020 may include rendering a vector image to generate a raster image at an appropriate resolution. The preprocessing step 1020 also implements an edge detection algorithm for identifying a number of curve segments that influence one or more pixels in the raster image, as set forth above. In another embodiment, the preprocessing step 1020 may be executed, at least in part, by a parallel processor, such as PPU 200. For example, the Jacobian matrices for each pixel of the raster image may be calculated in parallel, or the metric values associated with each edge pixel may be calculated in parallel. The IRT acceleration data structure 1000 may be stored in a memory, either volatile or non-volatile, for immediate use or to be loaded when rendering images at a later point in time.

The IRT acceleration data structure 1000 includes a texture map 1002 that comprises a two-dimensional array of color values. In some embodiments, the texture map 1002 is a MIP map that stores the down-sampled raster images that form the MIP map hierarchy. The IRT acceleration data structure 1000 also includes a curve index map 1004 that associates each pixel in the texture map with zero or more curve segments corresponding with the pixel. The curve data map 1006 stores parameters for each curve segment that influences the pixels in the raster image.

Figure 11:
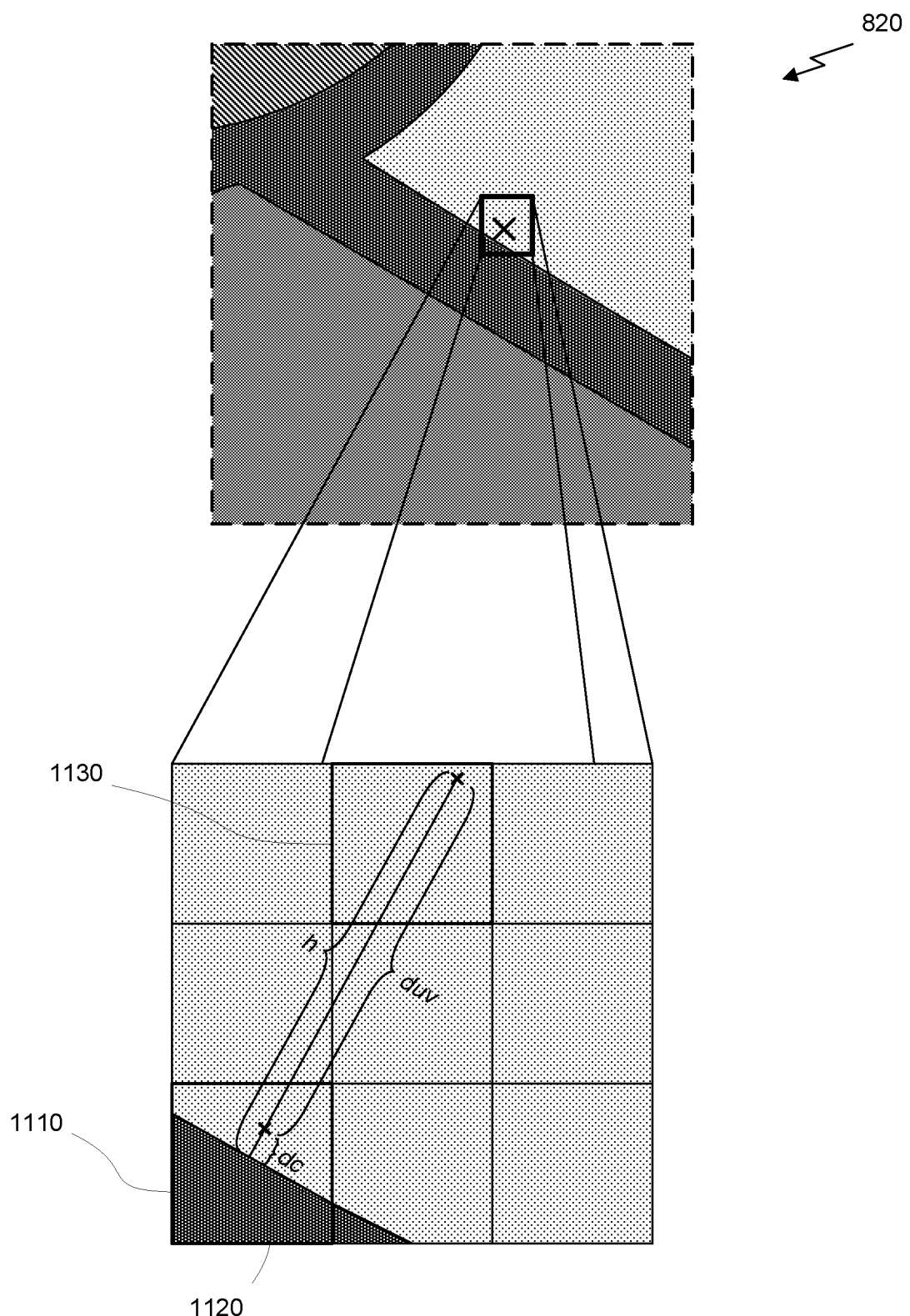
FIG. 11 illustrates a technique for calculating an adjustment vector based on a proximate distance of a sample location from a curve segment, in accordance with one embodiment.

A compute step 1030 calculates a sample location adjustment vector, duv, by determining whether any curve segments influence a pixel in the raster image 1002 that corresponds with the sample location x. FIG. 11 illustrates a technique for calculating an adjustment vector based on a proximate distance of a sample location from a curve segment, in accordance with one embodiment. As shown in FIG. 11, a sample location x is located in a pixel 1110 of the texture map 1002 in the IRT acceleration data structure 1000. A Voronoi region of curve segment 1120 overlaps the pixel 1110. The IRT acceleration data structure 1000 includes a curve index map 1004, which has an entry corresponding to pixel 1110 that stores an index into a curve data map 1006 that includes parameters for the curve segment 1120. A distance dc is calculated by accessing the curve index map 1004 using the texture coordinates for the sample location x. If the access returns a void value, then that means no curve segments influence the pixel associated with the sample location x. In this case, the access returns an index into the curve data map 1006, which can be accessed via the index to read the parameters for one or more curve segments that influence the pixel 1110. The distance dc is calculated by evaluating function $f$, as given in Equation 13 or Equation 20. The adjustment vector duv is then calculated as follows:

$$duv=(h-dc)\cdot n_i \qquad \text{(Eq. 21)}$$

where h is an assumed size of a convolution kernel that distorts colors proximate to the edges, and $n_i$ is the interpolated normal of the curve segment 1120 corresponding to the sample location x. In one embodiment, the magnitude of h is set equal to 2V pixels, which is the length of two pixel diagonals in the raster image. Again, h is also the distance from the curve segment to the edge of the truncated Voronoi region associated with the curve segment and affects which pixels are influenced by the curve segment. As shown, the new sample location may be in an entirely different pixel (e.g., pixel 1130) than the original sample location x.

In one embodiment, anti-aliasing options may be implemented that affect the calculation of duv. Equation 21 is a monotonically decreasing function with a maximum at dc=0. The edges can be blurred by decreasing duv when the distance to the curve dc is below a threshold $\alpha$. The threshold $\alpha$ will be less than h such that the adjustment vector duv moves the sample location x to the edge of the truncated Voronoi region except when the sample location is close to the curve (i.e., dc<α), at which point the adjustment vector duv is reduced such that the sample location x will stay closer to the edge.

However, changing the profile of Equation 21 to implement anti-aliasing is not sufficient since the gradient in the immediate neighborhood of a curve segment is a local maximum as a matter of choice. Thus, when decreasing duv when dc<α, the LOD utilized for sampling the texture map 1002 should also be increased. Because the texels encoded in higher MIP levels are already down-sampled, these down-sampled color values can be used to alleviate aliasing in such samples. It will be appreciated that this anti-aliasing mode is only implemented when the LOD based on the pixel ration is zero, indicating that a screen pixel size is less than a texel size. When the LOD based on the pixel ratio is greater than zero, no adjustment vector will be calculated and the texture map at higher MIP levels is simply sampled without calculating any adjustment vector.

Returning to FIG. 10, a sampling step 1040 samples the texture map 1002 in the IRT 1000 based on the adjusted sample location $x_{new}$:

$$x_{new} = x_{old} + duv \qquad \text{(Eq. 22)}$$

The adjustment vector duv, when added to sample location x, moves the sample location to the edge of the truncated Voronoi region associated with the curve segment. This causes the sample values to be taken and interpolated away from the edge in the image. If multiple curve segments influence the pixel corresponding to the original sample location, then multiple intermediate adjustment vectors $duv_i$ are calculated and the adjusted sample location is simply given by summing all of the intermediate adjustment vectors and adding the summed vector to the sample location x:

$$x_{new} = x_{old} + \Sigma duv_i \qquad \text{(Eq. 23)}$$

As with conventional texture maps, the returned color value is generated via a texture unit that interpolates four texel values in the texture map 1002 based on the new sample location $x_{new}$.

In one embodiment, the texture map 1002 in the IRT acceleration data structure 1000 is a MIP map and a level of detail is calculated prior to computing the adjustment vector(s). If the LOD is zero, then adjustment vectors are calculated at the compute step 1030. However, if the LOD is anything above zero, then the texture will be sampled immediately using $x_{old}$ at that particular level of detail since the pixel is larger than a texel and the texture map being sampled will already have been down-sampled from the highest resolution texture map to a point where the adjustment vector may not have the desired effect and wastes valuable clock cycles (i.e., the adjustment vector may be significantly smaller than a texel at that level of detail and, therefore, the new sample location may simply change the weights in the interpolation and not change which values are being interpolated).

In one embodiment, it will be appreciated that steps 1030 and 1040 may be implemented as instructions included in a pixel shader/fragment shader program executed by PPU 200. Similarly, step 1020 may also be implemented as instructions included in a pixel shader/fragment shader program. However, step 1020 will typically be implemented in a separate program from steps 1030 and 1040.

Figure 12:
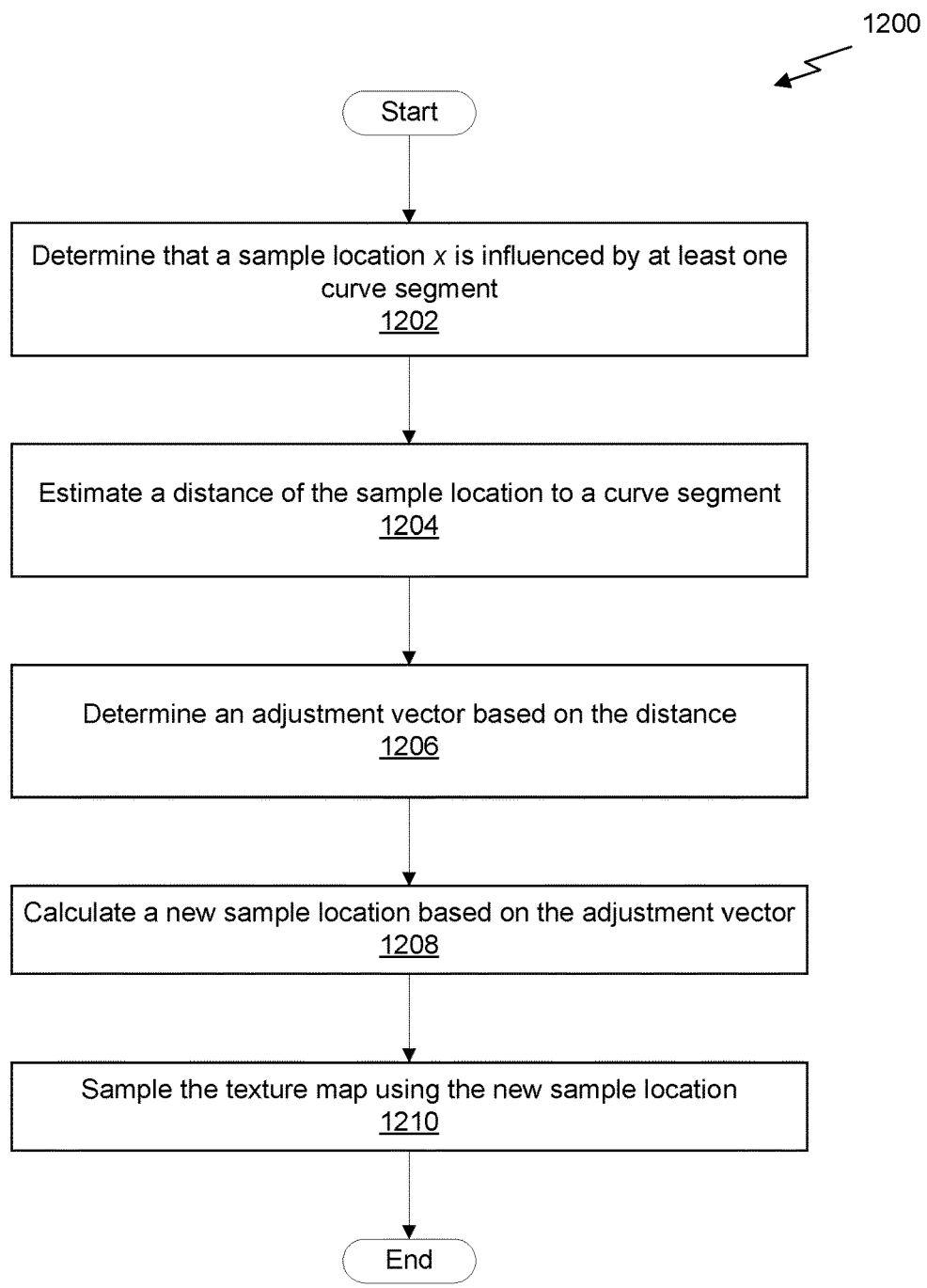
FIG. 12 illustrates a flowchart of a method for generating a color sample utilizing an infinite resolution texture acceleration data structure, in accordance with one embodiment.

FIG. 12 illustrates a flowchart of a method 1200 for generating a color sample utilizing an IRT 1000, in accordance with one embodiment. It will be appreciated that the method 1200 is described within the scope of software executed by a processor; however, in some embodiments, the method 1200 may be implemented in hardware or some combination of hardware and software. The method 1200 begins at step 1202, where a processor determines that a sample location x is influenced by at least one curve segment. In one embodiment, the processor is PPU 200 and a shader program includes an instruction that reads the curve index map 1004 using texture coordinates for sample location x. If the value returned from the curve index map 1004 is void, then no curve segments influence the pixel associated with sample location x. However, if the value returned from the curve index map 1004 is not void (i.e., the returned value is an index into the curve data map 1006), then the sample location x is influenced by at least one curve segment. The parameters for a curve segment may be read from the curve data map 1006 using the index read from the curve index map 1004.

At step 1204, a processor estimates a distance, dc, of the sample location x to the curve segment based on the parameters read from the curve data map 1006. The distance dc may be calculated by evaluating the function $f$ of Equation 13 or Equation 20, depending on the form of parameters stored in the curve data map 1006. At step 1206, a processor determines an adjustment vector based on the distance dc. The adjustment vector may be calculated using Equation 21. In some cases, multiple curve segments influence the pixel and, therefore, the adjustment vector is a sum of a plurality of intermediate adjustment vectors calculated for each of the influencing curve segments.

At step 1208, a processor calculates a new sample location based on the adjustment vector. The adjustment vector duv may be added to the sample location to determine the new sample location. At step 1210, a processor samples the texture map 1002 using the new sample location.

In one embodiment, method 1200 is only performed if a level of detail (LOD) calculated based on a pixel ratio (i.e., a ratio of pixel size in the image being rendered to texel size) is zero. If the LOD is greater than zero, then the texture map 1002 may be sampled immediately using the sample location x.

Figure 13:
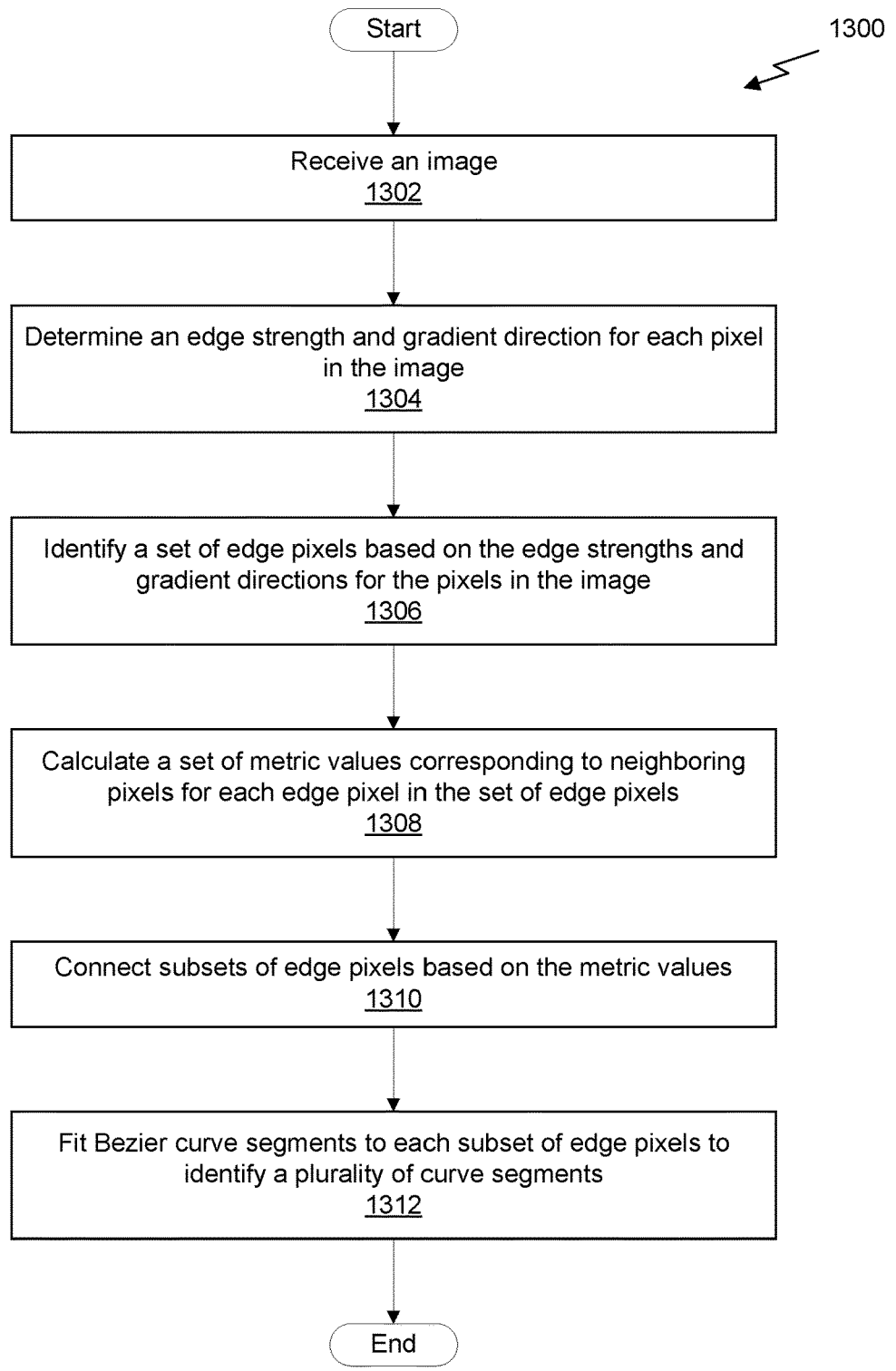
FIG. 13 illustrates a flowchart of a method for detecting edges in an image, in accordance with one embodiment.

FIG. 13 illustrates a flowchart of a method 1300 for detecting edges in an image, in accordance with one embodiment. It will be appreciated that the method 1300 is described within the scope of software executed by a processor; however, in some embodiments, the method 1300 may be implemented in hardware or some combination of hardware and software. The method 1300 begins at step 1302, where an image is received. The image is a raster image encoded as a 2D array of pixel values at a particular resolution. In one embodiment, the image may be resampled at a different resolution to have a desired resolution of the IRT 1000.

At step 1304, an edge strength and gradient direction are determined for each pixel in the image. In one embodiment, a Jacobian matrix J is calculated for each pixel using the Scharr operator applied to each color component of the image. The edge strength of the pixel may be set to the maximum eigenvalue associated with the matrix $J^T J$ and the gradient direction may be given by the corresponding eigenvector for the maximum eigenvalue.

At step 1306, a set of edge pixels is identified based on the edge strengths and gradient directions for the pixels in the image. In one embodiment, a non-maximum suppression step is used to invalidate all pixels in the image that do not have a local-maximum edge strength along the gradient direction associated with the pixel.

At step 1308, a set of metric values is calculated for each edge pixel. Each set of metric values includes a metric value corresponding to each neighboring edge pixels to the edge pixel. At step 1310, the edge pixels are connected into subsets of edge pixels corresponding to discrete curves, each curve may include multiple curve segments. In one embodiment, curves may be suppressed (i.e., edge pixels included in the subset of edge pixels for the curve may be invalidated) when a mean edge strength for all edge pixels in the subset is below a threshold value σ. At step 1312, Bezier curve segments are fit to each subset of edge pixels to identify a plurality of curve segments. Straight segments may be encoded as Bezier curve segments where all control points lie on the straight line. The control points that define a Bezier curve segment may be used to calculate the necessary parameters for encoding the curve segment in the curve data map.

Figure 14:
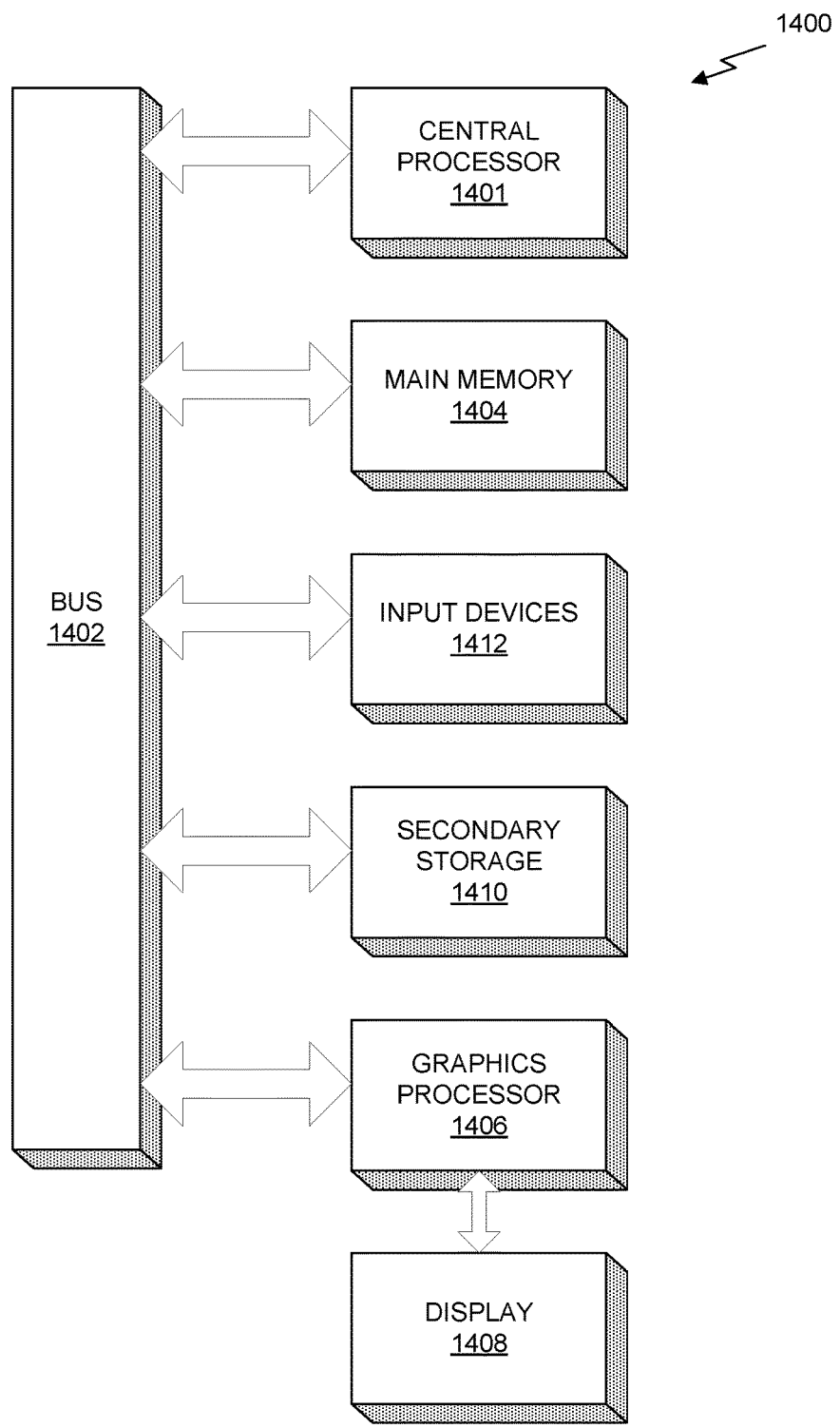
FIG. 14 illustrates an exemplary system in which the various architecture and/or functionality of the various previous embodiments may be implemented.

FIG. 14 illustrates an exemplary system 1400 in which the various architecture and/or functionality of the various previous embodiments may be implemented. As shown, a system 1400 is provided including at least one central processor 1401 that is connected to a communication bus 1402. The communication bus 1402 may be implemented using any suitable protocol, such as PCI (Peripheral Component Interconnect), PCI-Express, AGP (Accelerated Graphics Port), HyperTransport, or any other bus or point-to-point communication protocol(s). The system 1400 also includes a main memory 1404. Control logic (software) and data are stored in the main memory 1404 which may take the form of random access memory (RAM).

The system 1400 also includes input devices 1412, a graphics processor 1406, and a display 1408, i.e. a conventional CRT (cathode ray tube), LCD (liquid crystal display), LED (light emitting diode), plasma display or the like. User input may be received from the input devices 1412, e.g., keyboard, mouse, touchpad, microphone, and the like. In one embodiment, the graphics processor 1406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1400 may also include a secondary storage 1410. The secondary storage 1410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1404 and/or the secondary storage 1410. Such computer programs, when executed, enable the system 1400 to perform various functions. The memory 1404, the storage 1410, and/or any other storage are possible examples of computer-readable media.

In one embodiment, the architecture and/or functionality of the various previous figures may be implemented in the context of the central processor 1401, the graphics processor 1406, an integrated circuit (not shown) that is capable of at least a portion of the capabilities of both the central processor 1401 and the graphics processor 1406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1400 may take the form of a desktop computer, laptop computer, server, workstation, game consoles, embedded system, and/or any other type of logic. Still yet, the system 1400 may take the form of various other devices including, but not limited to a personal digital assistant (PDA) device, a mobile phone device, a television, etc.

Further, while not shown, the system 1400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
 receiving an image;
 generating an infinite resolution texture (IRT) acceleration data structure associated with the image, comprising:
  analyzing the image utilizing an edge detection algorithm to identify a plurality of curve segments associated with the image;
  defining a truncated Voronoi region for each curve segment in the plurality of curve segments; and
  generating a curve index map and a curve data map based on the truncated Voronoi regions, wherein the IRT acceleration data structure includes a texture map, the curve index map, and the curve data map; and
 storing the IRT acceleration data structure in a memory,
  wherein the texture map includes a two-dimensional array of texels, each texel encoding a color value based on the image,
  wherein the curve data map encodes parameters for at least one curve segment associated with the image, and
  wherein the curve index map associates each texel in the texture map with zero or more curve segments corresponding with the texel.

2. The method of claim 1, wherein analyzing the image comprises:
 for each pixel in the image, determining an edge strength and a gradient direction for the pixel based on a Jacobian matrix $J$ corresponding to the pixel;
 identifying a set of edge pixels in the image based on the edge strengths and gradient directions for the pixels in the image;
 for each edge pixel in the set of edge pixels, calculating a set of metric values corresponding to neighboring pixels for the edge pixel;

connecting subsets of edge pixels based on the metric values; and fitting a Bezier curve segment to each subset of edge pixels to identify the plurality of curve segments.

3. The method of claim 1, wherein the image is a vector image, and wherein the texture map is generated by rendering the vector image at a particular resolution.

4. A method comprising:

receiving an image;

generating an infinite resolution texture (IRT) acceleration data structure associated with the image, wherein the IRT acceleration data structure includes a texture map, a curve index map, and a curve data map;

storing the IRT acceleration data structure in a memory, wherein the texture map includes a two-dimensional array of texels, each texel encoding a color value based on the image, wherein the curve data map encodes parameters for at least one curve segment associated with the image, and wherein the curve index map associates each texel in the texture map with zero or more curve segments corresponding with the texel;

determining an adjustment vector for a sample location based on parameters stored in the curve data map; and sampling, via a texture unit associated with a parallel processing unit, the texture map based on a new sample location calculated by adding the adjustment vector to the sample location.

5. The method of claim 4, wherein determining the adjustment vector comprises:

estimating a distance of the sample location to a curve segment based on parameters for the curve segment stored in the curve data map; and determining the adjustment vector by multiplying a difference between the distance of the sample location to the curve segment and a parameter h by an interpolated normal vector to the curve segment.

6. The method of claim 4, wherein determining the adjustment vector comprises:

estimating distances of the sample location to a plurality of curve segments based on parameters for the plurality of curve segments; and determining the adjustment vector by summing a plurality of intermediate adjustment vectors corresponding to the plurality of curve segments, wherein each intermediate adjustment vector is calculated by multiplying a difference between the distance of the sample location to a corresponding curve segment and a parameter h by an interpolated normal vector to the corresponding curve segment.

7. A method comprising:

receiving an image;

generating an infinite resolution texture (IRT) acceleration data structure associated with the image, wherein the IRT acceleration data structure includes a texture map, a curve index map, and a curve data map;

storing the IRT acceleration data structure in a memory, wherein the texture map includes a two-dimensional array of texels, each texel encoding a color value based on the image, wherein the curve data map encodes parameters for at least one curve segment associated with the image, and wherein the curve index map associates each texel in the texture map with zero or more curve segments corresponding with the texel;

determining a level of detail (LOD) for sampling the texture map; and if the LOD is greater than zero, then immediately sampling the texture map at the LOD according to a sample location, or if the LOD is equal to zero, then determining an adjustment vector for the sample location based on parameters stored in the curve data map and sampling the texture map at the LOD according to a new sample location calculated by adding the adjustment vector to the sample location.

8. A system, comprising:

a memory storing an image; and a processor configured to:

generate an infinite resolution texture (IRT) acceleration data structure associated with the image, comprising:

analyzing the image utilizing an edge detection algorithm to identify a plurality of curve segments associated with the image;

defining a truncated Voronoi region for each curve segment in the plurality of curve segments; and generating a curve index map and a curve data map based on the truncated Voronoi regions, wherein the IRT acceleration data structure includes a texture map, the curve index map, and the curve data map, and store the IRT acceleration data structure in the memory, wherein the texture map includes a two-dimensional array of texels, each texel encoding a color value based on the image, wherein the curve data map encodes parameters for at least one curve segment associated with the image, and wherein the curve index map associates each texel in the texture map with zero or more curve segments corresponding with the texel.

9. The system of claim 8, wherein analyzing the image comprises:

for each pixel in the image, determining an edge strength and a gradient direction for the pixel based on a Jacobian matrix $J$ corresponding to the pixel;

identifying a set of edge pixels in the image based on the edge strengths and gradient directions for the pixels in the image;

for each edge pixel in the set of edge pixels, calculating a set of metric values corresponding to neighboring pixels for the edge pixel;

connecting subsets of edge pixels based on the metric values; and fitting a Bezier curve segment to each subset of edge pixels to identify the plurality of curve segments.

10. The system of claim 8, wherein the image is a vector image, and wherein the texture map is generated by rendering the vector image at a particular resolution.

11. A system comprising:

a memory storing an image; and a processor configured to:

generate an infinite resolution texture (IRT) acceleration data structure associated with the image, wherein the IRT acceleration data structure includes a texture map, a curve index map, and a curve data map, store the IRT acceleration data structure in the memory, wherein the texture map includes a two-dimensional array of texels, each texel encoding a color value based on the image, wherein the curve data map encodes parameters for at least one curve segment associated with the image, and wherein the curve index map associates each texel in the texture map with zero or more curve segments corresponding with the texel determine an adjustment vector for a sample location based on parameters stored in the curve data map; and sample, via a texture unit associated with a parallel processing unit, the texture map based on a new sample location calculated by adding the adjustment vector to the sample location.

12. The system of claim 11, wherein determining the adjustment vector comprises:

estimating a distance of the sample location to a curve segment based on parameters for the curve segment stored in the curve data map; and determining the adjustment vector by multiplying a difference between the distance of the sample location to the curve segment and a parameter h by an interpolated normal vector to the curve segment.

13. The system of claim 11, wherein determining the adjustment vector comprises:

estimating distances of the sample location to a plurality of curve segments based on parameters for the plurality of curve segments; and determining the adjustment vector by summing a plurality of intermediate adjustment vectors corresponding to the plurality of curve segments, wherein each intermediate adjustment vector is calculated by multiplying a difference between the distance of the sample location to a corresponding curve segment and a parameter h by an interpolated normal vector to the corresponding curve segment.

14. A system comprising:

a memory storing an image; and a processor configured to:

generate an infinite resolution texture (IRT) acceleration data structure associated with the image, wherein the IRT acceleration data structure includes a texture map, a curve index map, and a curve data map, store the IRT acceleration data structure in the memory, wherein the texture map includes a two-dimensional array of texels, each texel encoding a color value based on the image, wherein the curve data map encodes parameters for at least one curve segment associated with the image, and wherein the curve index map associates each texel in the texture map with zero or more curve segments corresponding with the texel determine a level of detail (LOD) for sampling the texture map; and if the LOD is greater than zero, then immediately sample the texture map at the LOD according to a sample location, or if the LOD is equal to zero, then determine an adjustment vector for the sample location based on parameters stored in the curve data map and sampling the texture map at the LOD according to a new sample location calculated by adding the adjustment vector to the sample location.

15. The system of claim 8, wherein the processor is a parallel processing unit that includes at least one texture unit configured to sample the texture map.

16. A non-transitory, computer-readable storage medium storing instructions that, when executed by a processor, cause the processor to perform steps comprising:

receiving an image;

generating an infinite resolution texture (IRT) acceleration data structure associated with the image, wherein the IRT acceleration data structure includes a texture map, a curve index map, and a curve data map;

storing the IRT acceleration data structure in a memory, wherein the texture map includes a two-dimensional array of texels, each texel encoding a color value based on the image, wherein the curve data map encodes parameters for at least one curve segment associated with the image, and wherein the curve index map associates each texel in the texture map with zero or more curve segments corresponding with the texel;

determining an adjustment vector for a sample location based on parameters stored in the curve data map; and sampling, via a texture unit associated with a parallel processing unit, the texture map based on a new sample location calculated by adding the adjustment vector to the sample location.

* * * * *

UNITED STATES PATENT AND TRADEMARK OFFICE
CERTIFICATE OF CORRECTION

PATENT NO. : 10,121,276 B2
APPLICATION NO. : 15/367086
DATED : November 6, 2018
INVENTOR(S) : Alexander V. Reshetov et al.

Page 1 of 1

It is certified that error appears in the above-identified patent and that said Letters Patent is hereby corrected as shown below:

In the Claims

Column 27, Line 8 Claim 4 please replace "A method comprising:" with --A method, comprising:--;
Column 27, Line 52 Claim 7 please replace "A method comprising:" with --A method, comprising:--;
Column 28, Line 56 Claim 11 please replace "A system comprising:" with --A system, comprising:--;
Column 29, Line 38 Claim 14 please replace "A system comprising" with --A system, comprising:--.

Signed and Sealed this
Eighteenth Day of February, 2020

Andrei Iancu
*Director of the United States Patent and Trademark Office*